(12) United States Patent
Smith

(10) Patent No.: US 9,165,129 B2
(45) Date of Patent: Oct. 20, 2015

(54) KEYBOARD AS BIOMETRIC AUTHENTICATION DEVICE

(75) Inventor: Ned M. Smith, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 14 days.

(21) Appl. No.: 13/532,852

(22) Filed: Jun. 26, 2012

(65) Prior Publication Data

US 2013/0347099 A1    Dec. 26, 2013

(51) Int. Cl.
G06F 17/30 (2006.01)
G06F 21/31 (2013.01)
G06F 21/32 (2013.01)

(52) U.S. Cl.
CPC ............... *G06F 21/316* (2013.01); *G06F 21/32* (2013.01)

(58) Field of Classification Search
CPC ........ G06F 21/31; G06F 21/32; G06F 21/316
USPC .......... 713/150, 168, 182, 185, 186; 726/2, 3, 726/5, 19, 26, 28
See application file for complete search history.

(56) References Cited

U.S. PATENT DOCUMENTS

| | | | | |
|---|---|---|---|---|
| 6,181,803 | B1* | 1/2001 | Davis ............................. | 382/115 |
| 6,193,153 | B1* | 2/2001 | Lambert ........................ | 235/380 |
| 6,487,662 | B1* | 11/2002 | Kharon et al. ................ | 713/186 |
| 6,636,973 | B1* | 10/2003 | Novoa et al. .................... | 726/20 |
| 6,928,547 | B2* | 8/2005 | Brown et al. .................. | 713/186 |
| 2008/0209229 | A1* | 8/2008 | Ramakrishnan et al. ..... | 713/186 |
| 2009/0134972 | A1 | 5/2009 | Wu et al. | |
| 2009/0151992 | A1 | 6/2009 | Kellis-Dicks et al. | |
| 2010/0164740 | A1 | 7/2010 | Lo et al. | |
| 2010/0302157 | A1* | 12/2010 | Zilberman .................... | 345/164 |
| 2011/0019600 | A1* | 1/2011 | Ping et al. ..................... | 370/311 |
| 2011/0125986 | A1* | 5/2011 | Reid .............................. | 712/203 |
| 2012/0098750 | A1* | 4/2012 | Allen et al. .................... | 345/169 |
| 2013/0104203 | A1* | 4/2013 | Davis et al. ....................... | 726/5 |

OTHER PUBLICATIONS

Uludag, Umut, Sharath Pankanti, Salil Prabhakar, and Anil K. Jain. "Biometric cryptosystems: issues and challenges." Proceedings of the IEEE 92, No. 6 (2004): 948-960.*

Giot, Romain, Mohamad El-Abed, and Christophe Rosenberger. "Greyc keystroke: a benchmark for keystroke dynamics biometric systems." In Biometrics: Theory, Applications, and Systems, 2009. BTAS'09. IEEE 3rd International Conference on, pp. 1-6. IEEE, 2009.*

(Continued)

*Primary Examiner* — Saleh Najjar
*Assistant Examiner* — Peiliang Pan
(74) *Attorney, Agent, or Firm* — Kacvinsky Daisak Bluni PLLC

(57) ABSTRACT

Various embodiments are generally directed to use of a keyboard as a biometric authentication device. In one embodiment, for example, an apparatus comprises a processor circuit executing a sequence of instructions causing the processor circuit to receive a signal indicative of a keypress of at least one key of a keyboard communicatively coupled to the apparatus, and indicative of at least one physical characteristic associated with the keypress; compare the at least one physical characteristic to at least one stored physical characteristic associated with at least one authorized user of the apparatus; and determine if the keypress is associated with at least one authorized user of the apparatus based on the comparison. Other embodiments are described and claimed herein.

28 Claims, 8 Drawing Sheets

(56) References Cited

OTHER PUBLICATIONS

Monrose, Fabian, and Aviel D. Rubin. "Keystroke dynamics as a biometric for authentication." Future Generation Computer Systems 16, No. 4 (2000): 351-359.*

Bergadano, Francesco, Daniele Gunetti, and Claudia Picardi. "User authentication through keystroke dynamics." ACM Transactions on Information and System Security (TISSEC) 5, No. 4 (2002): 367-397.*

DPM / C81 C8P User's Guide, Published by Peavey Electronics Corporation, copyright 1995.

DPM / C8X Keyboard MIDI Controller features guide, Peavey Electronics Corporation, http://www.peavey.com/c8x © 1997.

International Search Report and Written Opinion received for PCT Patent Application No. PCT/US2013/044613, mailed Sep. 6, 2013, 17 pages.

Araujo et al., "User Authentication Through Typing Biometrics Features", IEEE Transactions on Signal Processing, Feb. 2005, vol. 53, No. 2, pp. 851-855, ISSN 1053-587X.

Tappert et al., "Keystroke Biometric Identification and Authentication on Long-Text Input" retrieved from <http://csis.pace.edu/~ctappert/it691-08fall/projects/keystroke-bookchap.pdf>.

\* cited by examiner

KEYBOARD AS BIOMETRIC AUTHENTICATION DEVICE

BACKGROUND

Authentication to separate authorized users of a computing device (e.g., a computer system, a data entry terminal, a smartphone, etc.) from unauthorized users has become increasingly important as individuals and organizations continue to store ever greater amounts of sensitive data on such devices, and as such devices become ever increasingly connected to still others of such devices through ever expanding arrays of wired and wireless networks. One long accepted approach to authentication is to require a would-be user of a computing device to enter a password that is intended to be known only to one or more authorized users, and perhaps also to one or more authorized system administrators having some degree of control over who is supposed to be an authorized user of that computing device. The use of passwords requires far fewer computational resources than various biometric-based approaches to authentication that have been previously proposed (e.g., reading finger prints, voice analysis, etc.).

Unfortunately, the use of passwords suffers numerous drawbacks. A password may become known to someone who is not an authorized user of a computing device, thereby enabling that unauthorized person to operate that computing device as if he/she were an authorized user. Passwords having characteristics in their combinations of characters or keystrokes that are deemed to make them "strong" passwords (e.g., passwords that are not easily guessed) tend to be difficult for authorized users to remember. Indeed, it is often the case that given an opportunity to create a password themselves, an authorized user will tend to create a "weak" password that may be a street name, a pet's name, an all-too simple sequence of numbers (e.g., "1234"), etc. that is all too easily guessed by others. Further, once discovered, a password is quickly and easily spread to others (e.g., via the Internet, on slips of paper, etc.). It is with respect to these and other considerations that the techniques described herein to utilize a keyboard as a biometric authentication device are needed.

DETAILED DESCRIPTION

Figure 1:
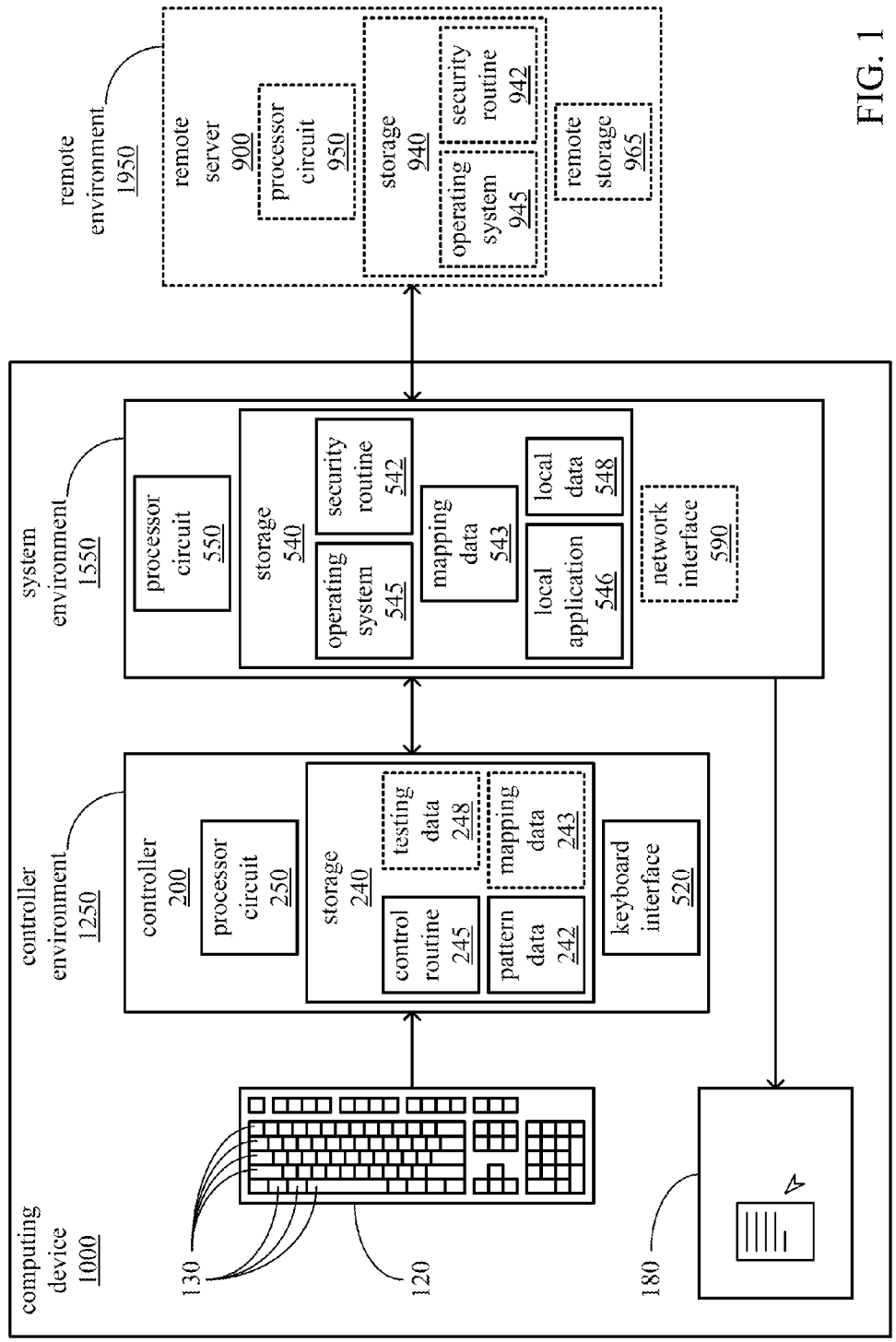
FIG. 1 illustrates side-by-side operating environments of an embodiment of a computing device.

Various embodiments are generally directed to authentication techniques. Some embodiments are particularly directed to use of an input device, such as a keyboard as a biometric authentication device. More specifically, a controller of a computing device receives data from a keyboard indicative of various physical characteristics of the manner in which a person operates the keys of the keyboard and employs that data in determining whether that person is an authorized user of the computing device. In doing so, the controller compares the data received from the keyboard with the pattern data comprising previously stored physical characteristics of the manner in which one or more authorized users of the computing device operate the keyboard. The controller then signals one or more other portions of the computing device with this determination, thereby enabling the computing device to either allow or deny access to an application and/or data. An advantage of authenticating users of the computing device based on such physical characteristics is that authorized users need not memorize a password or engage in various efforts to maintain the secrecy and security of a password, including regularly changing a password. Instead, authorized users are given an opportunity to type text, which could be text of their choosing, or could be a preselected text that could even be allowed to be freely distributed and widely known, since it is the physical characteristics of the manner in which the text is typed, and not the content of the text itself, that is used in authentication.

In one embodiment, for example, an apparatus comprises a first processor circuit, and a first storage communicatively coupled to the first processor circuit and storing a first sequence of instructions that when executed by the first processor circuit, causes the first processor circuit to: receive a signal indicative of a keypress of at least one key of a keyboard communicatively coupled to the apparatus, and indicative of at least one physical characteristic associated with the keypress; compare the at least one physical characteristic to at least one stored physical characteristic associated with at least one authorized user of the apparatus; and determine if the keypress is associated with at least one authorized user of the apparatus based on the comparison. Other embodiments are described and claimed herein.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may comprise a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of a computing device 1000 in which a keyboard 120 of the computing device 1000 is employed in biometric authentication of a user. The computing device 1000 may be any of a wide variety of computing devices, including without limitation, a desktop computer system, a data entry terminal, a laptop computer, a netbook computer, a tablet computer, a handheld personal data assistant, a smartphone, etc. The keyboard 120 may be an of a variety of input devices comprising a plurality of keys by which text (e.g., numbers, textual characters, mathematical symbols, phonetic characters, etc.), musical notes, codes (e.g., telephone numbers dates, etc.), and/or other forms of data may be input by a person through pressing multiple ones of the plurality of keys, including without limitation, "QWERTY" keyboards, Dvorak keyboards, telephone keypads, digital piano keyboards, calculator keypads, cash register keypads, keypads of smartphones or personal data assistants, touch screen keyboards (e.g., keyboards drawn on a display with a touch sensor overlay), virtual keyboards projected onto a surface, etc. In various embodiments, the keyboard 120 may be coupled (either permanently or separably) to other components of the computing device 1000 via a wired or wireless connection capable of conveying data indicating physical characteristics of the operation of its plurality of keys 130, or may be physically incorporated into a casing of the computing device 1000 into which others of its components are also incorporated. Thus, especially where the computing device 1000 is meant to be useable in a highly portable mode, the keyboard 120 may not always be coupled to the rest of what the computing device 1000 comprises. Alternatively, the computing device 1000 may permanently comprise the keyboard 120.

In various embodiments, the computing device 1000 comprises a controller 200 that itself comprises a processor circuit 250 and a storage 240 accessible to the processor circuit 250 in which is stored at least a control routine 245 and a pattern data 242. As will be explained in greater detail, the processor circuit 250 executes a sequence of instructions of the control routine 245 to receive data from the keyboard 120 indicative of various physical characteristics of the keystrokes of a person operating the keys 130 of the keyboard 120 and to employ that data in determining whether that person is an authorized user. In making this determination, the processor circuit 250 compares the data received from the keyboard 120 with the pattern data 242 comprising previously stored physical characteristics of the manner in which one or more authorized users of the computing device 1000 operate the keyboard 120. The computing device 1000 further comprises another processor circuit 550 and another storage 540 accessible to the processor circuit 550 in which is stored at least a security routine 542. The processor circuit 550 executes a sequence of instructions of at least the security routine 542 to receive an indication from the controller 200 indicating the results of the determination of whether that person operating the keyboard 120 is an authorized user, and to employ that determination in either allowing or denying that person access to an application and/or data (e.g., a local application 546 and/or local data 548 that may also be stored within the storage 540).

An advantage of authenticating users of the computing device 1000 through a comparison of the physical characteristics of the manner in which each uses the keyboard 120 to previously stored data indicative of such physical characteristics for one or more authorized users is that authorized users need not memorize a password or engage in various efforts to maintain the secrecy of a password, including regularly changing a password. As will be explained in greater detail, persons operating the keyboard 120 may be authenticated as being either authorized users, or not, while typing whatever they wish. Alternatively, as will also be explained in greater detail, persons may be presented with specific preselected text that they must type into the keyboard 120 to be authenticated. Given that authentication is based on physical characteristics of the manner in which they type that preselected text, and not on their memory of the preselected text itself, the preselected text (unlike a password) may be allowed to be freely known even by those who are not authorized users of the computing device 1000, thereby affording another advantage inasmuch as efforts need not be made to keep the preselected text secret. Furthermore, given a range and combination of physical characteristics that may be associated with a specific authorized user, it becomes very difficult to mimic or spoof such physical characteristics, thereby leading to a more secure form of authentication and access control that cannot be transferred between persons. Other advantages exist as well.

However, it should be noted that, although much of the discussion herein focuses on the use of the characteristics of the manner in which a person operates a keyboard as a basis of authentication, such authentication may be used in conjunction with other forms of authentication, including without limitation, passwords, fingerprints, voiceprint, handwriting recognition, asymmetric security keys, eye scan, etc. Such other forms of authentication may be offered as an alternative to the characteristics with which someone operates a keyboard (especially where data concerning a particular person's characteristics for using a keyboard has not yet been stored for use in authentication, as will be discussed), or may be employed as additional "factors" in an authentication scheme in which more than one form of authentication must be provided for someone to be authenticated as an authorized user (e.g., a combination of the characteristics of the manner in which a person operates the keyboard 120 and their fingerprint).

In their separate execution of separately stored sequences of instructions, the processor circuits 250 and 550 operate within operating environments that are kept largely separate from each other, namely, a controller environment 1250 in which the processor circuit 250 operates and a system environment 1550 in which the processor circuit 550 operates. The controller environment 1250 is the operating environment for biometric authentication operations for an input device (e.g., the keyboard 120). The system environment 1550 is the operating environment of the computing device 1000 that is meant to be accessible to an authorized user of the computing device 1000 for the purposes of running applications (e.g., the local application 546) and working with data (e.g., the local data 548). Thus, it is expected that an operating system 545 providing aspects of a user interface, a file system, and access control to input/output devices and/or storage devices will also be stored within the storage 540 to enable an authorized user to make such use of the computing device for such purposes to run applications (e.g., a word processor, image generating software, etc.) to view or otherwise work with data (e.g., documents, digitized photographs or audio, etc.).

However, different operation systems incorporate different ranges of capability for implementing or supporting various forms of authentication by a would-be user is allowed to make use of an operating environment that includes a given operating system. It may be that the security routine 542 comprises a sequence of instructions that is separate from the operating system 545, but is specifically selected for use with the operating system 545 to enable the operating system 545 to make use of the authentication features implemented within the separate operating environment 1250, as will be described, including allowance or denial of access to specific applications and/or data. However, it may be that operating system 545 incorporates the security routine 542 as a component of the operating system, such that operating system 545 is able to make use of the authentication features implemented within the separate operating environment 1250 without augmentation by other sequences of instruction.

Separating the controller environment 1250 from the system environment 1550 provides additional security benefits. User access to the system environment 1550 enables infiltration with applications and/or data containing malicious sequences of instructions (e.g., so-called "viruses", "worms", etc.), including sequences of instructions meant to subvert or defeat user authentication mechanisms. As will be familiar to those skilled in securing computing devices, it is all too common for users to be induced into loading such forms of malicious software onto a computing device through either physical storage media (e.g., compact flash cards, USB "thumb" drives, etc.) or access to other computing devices through a network (e.g., the Internet). The separation of the controller environment 1250 from the system environment 1550 prevents whatever infiltration of the system environment 1550 that may occur from also bringing about an infiltration of the controller environment 1250. More specifically, this ensures that the pattern data 242 remains accessible only to the processor circuit 250 and only for purposes of user authentication, as has been described. Thus, procedures carried out by the processor circuit 250 within the controller environment 1250 serve to support authorized user operation of the computing device 1000 as enabled in the system environment 1550.

It should be noted that although much of the discussion of the operating environment 1250 herein is focused on the role played by the controller 200 in authentication of a person operating a keyboard for determining whether or not they are allowed access to the operating environment 1550 (and to what degree), the controller 200 may serve one or more other roles in the operation of the computing device 1000. By way of example, the processor 250, in executing the control routine 245, may monitor voltages and/or temperatures of various components of the computing device 1000, may oversee and/or implement data redundancy calculations employed in storing data, may monitor one or more components for indications of the operating environment 1550 becoming unstable (e.g., a "system hang"), overseeing and/or implementing firewall features of a network interface, etc.

Despite the improved security offered by such a separation of operating environments as just described, various alternate embodiments may employ only a single operating environment, namely, the system environment in which the processor circuit 550 performs the functions described herein as being separately performed by the processor circuit 250. Such alternate embodiments may be deemed desirable where the data and/or applications to which access may or may not be allowed as a result of a person being authenticated as an authorized user, or not, are not so sensitive that great harm will be deemed to have been done if someone who is not an authorized person is able to gain access to one or the other of them. Such alternate embodiments may be deemed to be at least acceptable where the computing device 1000 is implemented as a sufficiently closed system that no mechanism is provided for an authorized user to load software, or where the mechanism by which software may be loaded is in some way highly restricted in its use.

In various embodiments, each of the processor circuits 250 and 550 may comprise any of a wide variety of commercially available processors, including without limitation, an AMD® Athlon®, Duron® or Opteron® processor; an ARM® application, embedded and secure processors; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, each of the processor circuits 250 and 550 may comprise a multi-core processor (whether the multiple cores coexist on the same or separate dies), and/or a multi-processor architecture of some other variety.

In various embodiments, each of the storages 240 and 540 may comprise any of a wide variety of types of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, or a plurality of storage devices organized into one or more arrays (e.g., multiple ferromagnetic disk drives organized into a Redundant Array of Independent Disks array, or RAID array). It should be noted that although each of the storages 240 and 540 are depicted as a single block in FIG. 1, either or both may comprise more than one distinct storage device that may be based on differing storage technologies.

In various embodiments, the operating system 545 may be any of a variety of available operating systems appropriate for whatever the processor circuit 550 comprises, including without limitation, Windows™, OS X™, Linux®, or Android OS™. Further, in various embodiments, applications and/or data that a person operating the keyboard 120 may or may not be allowed to access (e.g., the local application 546 and/or the local data 548) may include any of a wide variety of types of sequences of instructions or forms of data, including without limitation, software computer files, including application files (e.g., document files, word processing files, spreadsheet files, presentation files, etc.), system files (e.g., operating system files, library files, utility files, etc.), multimedia content files (e.g., audio files, video files, audio/video files, picture files, image files, etc.), user interface elements 112, a web page, a uniform resource locator (URL) from a web browser, clipboard data, screenshots, device resource data (e.g., sensor data), and so forth.

As will be discussed, later in detail, the computing device 1000 may be further coupled to (or perhaps, further comprise) a display 180 on which prompts to enter text may be displayed. Alternatively or additionally, the computing device 1000 may be further coupled to a remote server 900, components of which may provide both digital processing and an executable sequence of instructions of a remote environment 1950 in which an application and/or data may be remotely stored.

Figure 2:
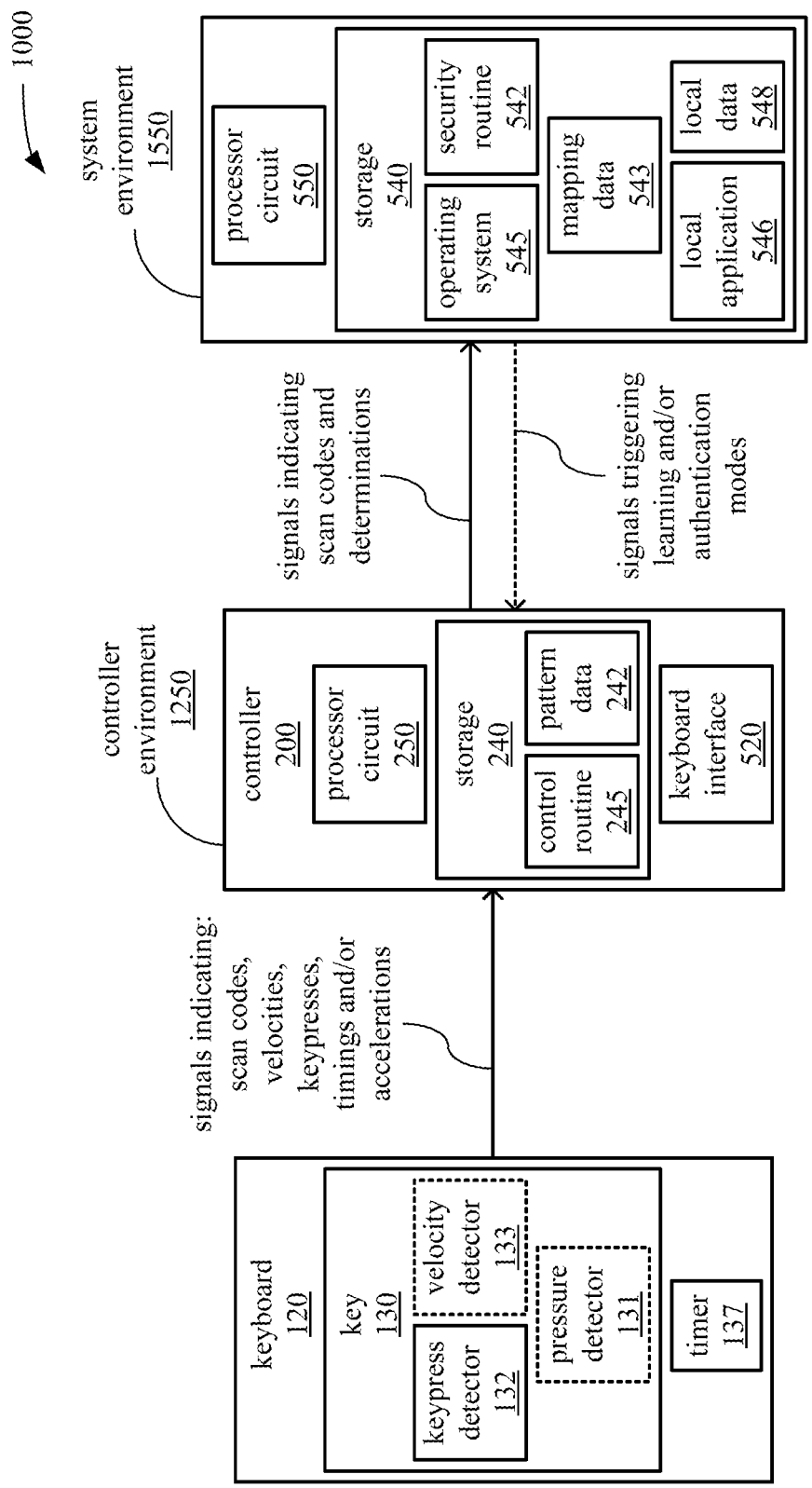
FIG. 2 illustrates a first portion of the embodiment of FIG. 1.

FIG. 2 illustrates a block diagram that is partially a subset of the block diagram of FIG. 1 and that also depicts further details of the keyboard 120 and its interaction with the controller environment 1250 and the system environment 1550. As will become apparent, more data concerning a person's operation of the keyboard 120 is provided by the keyboard 120 to the controller 200 than is relayed by the controller 200 to other portions of the computing device 1000.

As previously discussed, the keyboard 120 comprises a plurality of keys 130. In various embodiments, each of the keys 130 comprises one or more of a pressure detector 131, a keypress detector 132 and a velocity detector 133. Alternatively, a single pressure detector 131, a single keypress detector 132 and/or a single velocity detector 133 may be implemented for more than one key 130. The keys 130 of the keyboard 120 may be based on any of a variety of possible technologies, including without limitation, mechanical key switches, capacitive sensing key switches, strain gauges, resistive or capacitive touch, etc. The choice of technologies at least partly dictates which ones of the pressure detector 131, the keypress detector 132 and the velocity detector 133 may actually be present in any given implementation of the keyboard 120, and accordingly, dictates which of at least some possible physical characteristics of the manner in which a given person operates the keyboard 120 can be detected and utilized for authentication. Further, depending on the manner in which one of these detectors 131-133 is implemented in each of the keys 130, one or more of the others of these detectors 131-133 may be rendered redundant.

In embodiments of the keyboard 120 in which each key 130 is implemented with a movable key cap that is able to move when pressed with a digit (e.g., a finger or thumb), the keys are said to have a range of "travel" as one of their characteristics. In other words, operation of such keys involves a mechanical movement. Where there is such mechanical movement, there is both a measurable velocity of the key cap when pressed and when released. Further, there is a measurable amount of pressure applied in pressing the key cap and a measurable amount of pressure in holding the key cap in its fully pressed position after the extent of available travel in pressing the key has been reached. It is commonplace to design keys of keyboards such that only reaching the state of being fully pressed will be detected as a successfully making a "keypress" of a given key such that the key is considered to have been pressed—in other words, typically, depressing a key cap only part of the extent of its available range of travel is usually not enough to cause a keypress to be detected.

Shape, size and physical condition of the digits of a person's hands, as well as the condition of other physical and mental attributes of a person, cause some degree of uniqueness in the physical characteristics of the manner in which each person among a plurality of people would operate a given keyboard. Different people have different ones of their digits (e.g., fingers and thumbs) that they are able to move more quickly and nimbly than others, and different people are able to press harder to differing degrees with different ones of their digits. Also, such traits of a digit change as a person moves that digit to reach a key that is closer to the base of that digit versus a key that is further away. This is but a subset of the attributes of a person making each person's set of digits unique that could be employed (through measurement of one or more of the resulting unique physical characteristics of manner of operation of the keyboard 120) to distinguish one person from another.

In embodiments of the keyboard 120 in which each key 130 is implemented as a touch surface such that there is little physical movement of any component of the keys 130 as they are operated, there is said to be no range of travel, and it is commonly said that only keypresses are detected. However, depending on the technology used, this may not be entirely accurate. Where a touch surface keyboard is implemented with an array of beams of light that are interrupted as each finger touches a location of a touch surface that corresponds to a key, it may be accurately said that only keypresses are detected. However, where resistive touch sensor technology is employed, a resistance level is changed at a given location corresponding to a key when a person presses the tip of a digit against it, and thus, in truth, such resistive touch sensor technology actually measures pressure. Where such technology is employed, it is typical to specify a threshold of resistance (which serves as a proxy for a threshold of pressure) beyond which is deemed to be an indication of a keypress. A threshold of pressure is also employed in determining whether a keypress has occurred where a touch surface keyboard is implemented with a plurality of strain gauges. Further, where capacitive touch sensor technology is employed, a capacitance level is changed as a tip of a digit approaches a given location of a surface that corresponds to a key and continues to change as that tip makes contact with that surface at that location and begins to flatten (since the tip of a typical human digit is typically somewhat resilient). Where such technology is employed, it is typical to specify a threshold of capacitance change which is deemed to be an indication of a keypress. Yet further, in a variant of touch-sensitive keyboard that is actually a "virtual" keyboard in which the keys 130 are projected onto a surface where a camera or other scanning-type optical sensor is employed to monitor the movements of the tips of a person's digits towards and away from the projected keys 130, velocity of tips of digits towards and away from individual ones of the projected keys 130 may be optically measured, in addition to occurrences of keypresses and key releases.

In keyboards designed primarily for text entry, it is commonplace to incorporate only a keypress detector in each of the keys, since typically, the function of such keyboards is only to indicate which of the keys corresponding to different text characters and/or functions has been pressed. This need to detect little more than keypresses makes such keyboards highly amenable to being implemented with technologies that either do or do not provide a range of travel for each key. However, in keyboards designed primarily for the playing of music, it is commonplace to incorporate the ability to detect the velocity with which each key is pressed, the velocity with which each key is subsequently released, and the amount of pressure applied to each key to hold it in its fully pressed state, in addition to the ability to detect each keypress. As those familiar with electronic music keyboards will readily recognize, such information as velocity and pressure are typically employed in modifying various characteristics of the notes that are played with each keypress. As a result, keyboards designed primarily for the playing music tend to require the use of keyboard technologies that do provide some range of travel so that there will be velocities that can be detected.

Therefore, embodiments of the keyboard 120 implemented using a technology that provides a range of travel arguably affords the opportunity to detect more in the way of physical characteristics of the manner in which a given person operates the keyboard 120 than embodiments of the keyboard 120 using a technology that does not provide a range of travel. However, there are other physical characteristics of the manner in which a given person operates a keyboard that are largely independent of such issues of technology, including without limitation, the amount of time a key is pressed and the amount of time that elapses between the pressing of keys. Variations in the shape, size, physical condition of a person's hands, as well as other physical and mental attributes of a person, often cause such timings to be unique between people, just as they cause physical characteristics such as velocity and pressure to be unique.

Further, aspects of languages used by each person and habits formed over time by each person in operating a keyboard can also cause such timings to be unique. Those skilled in the area of psychology will be familiar with what is called "chunking" in which recurring use of a given combination or sequence of things done by a person repeatedly over time causes that combination to cease to be treated in their mind as a combination of things and to become treated in their mind as a single thing. An example of where chunking affects a physical characteristic of timing in a person's use of a keyboard employed in text entry is exemplified in the typing of the word "the" by persons who frequently type English text. The word "the" occurs more frequently in English than most other words. As a result, it is not uncommon for those trained in touch typing to develop a particular pattern of faster timings in typing the word "the" than many other words they may typically type. Over time, what has happened in these individuals is that their brains have become "hard wired" to move the digits of their fingers in a relatively consistent recurring pattern to more quickly type the word "the" on a text keyboard—in other words, the typing of the word "the" has been "chunked" in their minds into a single unitary activity in which they no longer actively think about the typing of each individual character of that word. While the word "the" is an example of chunking that is highly commonplace for many who type English text, many individuals (regardless of language) have occupations or interests that involve the use of a vocabulary with words that are not in commonplace use outside that occupation or interest. For such individuals, the typing of such less commonplace words can be subjected to chunking such that they type those less commonplace words with faster timings than most other persons. The chunking of such less commonplace words can, therefore, bring about timings in operating a keyboard that are unique to those persons.

Unfortunately, the measuring of such timings can be adversely affected, depending on the manner in which the keyboard 120 is coupled to the controller 200. As previously discussed, differing embodiments are possible in which the keyboard 120 is or is not incorporated into a casing into which other components of the computing device 1000 are also incorporated. In embodiments in which the keyboard 120 is so incorporated, the opportunity may be provided to more directly couple detectors associated with each of the keys 130 (e.g., one or more of the detectors 131-133) to the controller 200 such that the controller 200 is able to directly monitor the amount of time each of the keys 130 is pressed and/or the amount of time that elapses between the pressing of keys, thereby allowing the controller 200 to do so more accurately. However, in embodiments in which the keyboard 120 is not so incorporated, the wired or wireless coupling of the keyboard 120 to the controller 200 may entail the use of a signaling technology that impairs accurate measurement of such timings by the controller 200.

It is commonplace to use some form of digital serial communications mechanism (either wired or wireless) in which sets of binary bits are grouped into what are frequently called "messages" that are serially transmitted and that indicate that a particular key has been pressed or has been released. In the case of keyboards employed in playing music, such messages also typically include a value indicative of at least the velocity with which the particular key was pressed or released, and the messages indicating the pressing of a key may be followed by one or more messages providing a value indicative of the amount of pressure with which the particular key is being held in its fully pressed state. Such frequent use of digital serial communications is an outgrowth of the manner in which circuitry co-located with the keys of a keyboard is typically designed to monitor the state of those keys. Over time, it has become commonplace to employ a substantially two-dimensional matrix scanning system to monitor the keys of many keyboards in which rows (or other defined subsets or groups of keys) are sequentially scanned. The positions of keys within such matrices has often resulted in each key being given a "scan code" that usually corresponds to their positions, and has often resulted in the keys being identified in the digitally serially transmitted messages by their scan codes. Unfortunately, some of the forms of digital serial communication that are typically used have data transfer rates that are sufficiently slow and/or protocols that are sufficiently time consuming to carry out that the timing with which messages indicating a keypress or key release are transmitted and received may be substantially unconnected to the amount of time a key is held in its fully pressed state or to the amount time that elapses between the pressing of keys.

In embodiments in which the controller 200 is more directly coupled to detectors associated with each of the keys 130 (e.g., one or more of the detectors 131-133), no such digital serial communications is interposed between those detectors and the controller 200, and therefore, no opportunity for such digital serial communications to impair the measurement of timings by the controller 200 exists. However, in embodiments in which the controller 200 is not so directly coupled, the keyboard 120 may further comprise a timer 137 employed by circuitry co-located with the detectors associated with each of the keys 130 to enable such circuitry to more accurately measure such timings, and to enable such timings to be indicated in digitally serially transmitted messages. Thus, in such embodiments, the controller 200 may receive messages indicating keypresses and/or key releases (along with scan codes identifying particular ones of the keys 130), velocities, pressures and/or timings via wired or wireless digital serial communications from the keyboard 120. Exactly which of these messages would be received by the controller 200 would at least partly depend on the technology on which the keyboard 120 is based, and accordingly, what types of detectors are associated with each of the keys 130.

In embodiments in which the controller 200 is less directly coupled to detectors associated with each of the keys 130 (e.g., one or more of the detectors 131-133), the keyboard 120 and the controller 200 may be coupled by any of a variety of electrically and/or optically conductive cabling by which signals indicating at least keypresses along with one or more physical characteristics of the manner in which a person operates the keyboard 120 may be conveyed. Further, such cabling may employ signaling and/or protocols conforming to any of a variety of industry standards, including without limitation, Ethernet (IEEE-802.3) or IEEE-1394 (more commonly called "Firewire") promulgated by the Institute of Electrical and Electronics Engineers (IEEE) of Washington, D.C.; Universal Serial Bus (USB) promulgated by the USB Implementers Forum, Inc. of Portland, Oreg.; RS-422 or RS-232-C promulgated by the Electronic Industries Alliance (EIA) of Arlington, Va.; or RC-5720C (more commonly called "Toslink") maintained by the Japan Electronics and Information Technology Industries Association (JEITA) of Tokyo, Japan. Alternatively, the keyboard 120 and the controller 200 may be coupled via a wireless link employing any of a variety of wireless technologies, including without limitation, infrared light, radio frequencies, ultrasound, etc. Further, such a wireless link may employ signaling and/or protocols conforming to any of a variety of industry standards, including without limitation, IEEE 802.11a, 802.11b or 802.11g promulgated by the IEEE; Bluetooth promulgated by the Bluetooth Special Interest Group of Bellevue, Wash.; or ZigBee promulgated by the ZigBee Alliance of San Ramon, Calif.

Regardless of the exact manner in which the controller 200 receives indications of at least keypresses along with indications of one or more physical characteristics of the manner in which a person operates the keyboard 120, as previously discussed, the processor circuit 250 is caused by execution of the control routine 245 to compare these indications of physical characteristics to the pattern data 242. The pattern data 242 comprises stored physical characteristics of the manner in which an authorized user of the computing device 1000 operates the keyboard 120. In various embodiments, the controller 200 is operable in a learning mode in which the processor circuit 250 is caused by execution of the control routine 245 to store data indicating physical characteristics of the manner in which an authorized user of the computing device 1000 operates the keyboard 120 based on indications of those physical characteristics received from the keyboard 120 being operated by that authorized user. In some of these embodiments, the learning mode may be triggered, either under manual control or automatically, by signals caused to be conveyed to the controller 200 by the processor circuit 550 in executing at least the security routine 542.

By way of example, a new authorized user may first be allowed access to make use of the system environment 1550 through a password-based authentication process or still another authentication process, perhaps provided for by the operating system 545. Then, the processor circuit 550 is caused by the security routine 542 to signal the controller 200 to enter the learning mode. In some variations, the new authorized user may be allowed to manually indicate that the learning mode should be entered so as to enable the physical characteristics of their operation of the keyboard 120 to be included in the pattern data 242. In other variations, the security routine 542 may cause the processor circuit 550 to await an indication from the controller 200 as to whether or not the new authorized user is recognized as an authorized user by the controller 200 while the controller 200 is not in the learning mode. Upon receiving no such indication of the new authorized user being recognized by the controller 200, the security routine 542 may then cause the processor circuit 550 to signal the controller 200 to enter the learning mode, automatically, in order to enable the new authorized user to be recognized as an authorized user by the controller 200 in the future.

Regardless of the exact manner in which the learning mode is triggered, in some embodiments, operation of the controller 200 in the learning mode may be completely transparent to a new authorized user (again, a user who has been authenticated by some other mechanism, and is not yet recognizable to the controller 200) such that the new authorized user is not required to type any particular word, phrase or other text, and instead, is able to simply proceed with using the computing device 1000. In such embodiments, the new authorized user is able to use the keyboard 120 to type whatever text they wish while the controller 200 remains in learning mode until sufficient text has been typed by the new authorized user that sufficient data indicative of physical characteristics of the manner in which they use the keyboard 120 is stored as part of the pattern data 242 to enable recognition of that new authorized user by the controller 200 in the future. Alternatively, and as will be explained in greater detail, the new authorized user may be presented with specific text to type as part of obtaining such sufficient data for storage as part of the pattern data 242.

In various embodiments, at times during which the controller 200 is not in a learning mode, the controller 200 may be in an authentication mode, either continuously, or perhaps when triggered. In some embodiments, the authentication mode may be triggered by a signal caused to be conveyed to the controller 200 by the processor circuit 550 as a result of executing at least the security routine 542. Such triggering may be the result of the processor circuit 550 receiving some indication of a person attempting to operate the computing device 1000 at a time when the computing device 1000 has been "locked" (i.e., is in a "locked mode") such that authentication must take place before the computing device 1000 is able to be operated (although some limited ability to operate the computing device 1000 is still provided to enable authentication, e.g., the keyboard 120 is still operable). In other embodiments where the controller 200 is continuously in the authentication mode (at least when not in the learning mode), the controller 200 may continuously compare physical characteristics of all operation of the keyboard 120 to determine whether a person operating the keyboard 120 is an authorized user on a continuing basis.

An advantage of the controller 200 being continuously in the authentication mode is that the controller 200 is caused to continuously watch for a change between the keyboard 120 being operated by an authorized user and being operated by a person who is not an authorized user. By way of example, it may be that a person already recognized by the controller 200 as an authorized user (such that access to an application and/or data has been allowed) has stepped away from the location of the computing device 1000 or has misplaced it, thereby tempting someone who is not authorized to attempt to make use of the computing device 1000. As the unauthorized person begins operating the keyboard 120, the controller 200, as part of continuously comparing the physical characteristics of all operation of the keyboard 120 to the pattern data 242, determines that the keyboard 120 is now being operated by someone who is not an authorized user. The controller 200 then signals the processor circuit 550 that the person who is now using the computing device 1000 is not an authorized user, enabling the processor circuit 550 to be caused by at least the security routine 542 to cease allowing access to at least an application and/or data (perhaps causing the computing device 1000 to enter into a locked mode in which little in the way of the functionality of the computing device 1000 remains accessible beyond what is needed to support authentication).

As previously discussed, the controller 200 receives more data concerning operation of the keyboard 120 than it relays onward to other portions of the computing device 1000. Specifically, in various embodiments, the controller 200 does not relay data concerning physical characteristics of the manner in which a person operates the keyboard 120 to the processor circuit 550 as part of maintaining the pattern data 242 as isolated from the system environment 1550 to preserve security. Instead, the controller 200 makes available to the system environment 1550 the indications of keypresses and key releases needed to enable the keyboard 120 to be employed as part of a user interface to the system environment 1550. Thus, the communication between the controller environment 1250 and the system environment 1550 is largely limited to the controller 200 relaying indications of keypresses and key releases, along with indications of determinations made as to whether a person operating the keyboard 120 is an authorized user, while the processor circuit 550 may be caused to signal the controller 200 to trigger entry into one or both of the learning and authentication modes.

In various embodiments, the controller 200 further comprises a keyboard interface 520 accessible to the processor circuit 550 as the mechanism to convey signals indicating at least keypresses (and perhaps, also key releases) to the system environment 1550. As those familiar with longstanding architectures commonly employed in computer systems will readily recognize, the operating system 545 may be created with one or more presumptions that a particular form of keyboard interface accessible to the operating system 545 with particular control and/or data bits at particular input/output (I/O) and/or memory addresses will be provided by the computing device 1000. Such presumptions may arise where the particular form of keyboard interface has been in longstanding use across a great many computing devices over an extended period of years such that it is looked upon as a "standard" feature of such computing devices. Therefore, the controller 200 may further comprise a form of the keyboard interface 520 that comprises circuitry implementing registers and/or memory buffer locations accessible to the processor circuit 550 at such specific addresses to mimic the behavior of such an expected keyboard interface. Alternatively, the control routine 245 may cause the processor circuit 250 to simulate the presence of the keyboard interface 520 by causing the processor circuit 250 to access memory locations in a storage device accessible to the processor circuit 550 (perhaps memory locations within the storage 540) in a manner conforming to such presumptions.

In various embodiments, the controller 200 may signal its determinations of whether a person operating the keyboard 120 is an authorized user, or not, through a second level authentication carried out between the controller environment 1250 and the system environment 1550. More precisely, after the processor 250 has been caused by control routine 245 to determine that a person operating the keyboard 120 is an authorized user, the processor 250 may be caused to operate the keyboard interface 520 in a manner that mimics the behavior of a person providing a password, an encryption key (perhaps as part of an asymmetric key encryption system between the two environments), or other input to the system environment 1550. In essence, the controller 200 must, itself, demonstrate that it is an "authorized user" from the perspective of the system environment 1550, as an additional layer of security in controlling access to the system environment 1550. This may also be deemed desirable in enhancing security by isolating the system environment 1550 from having access to aspects of that person's user account on the computing device 1000, such as an account identifier. Since from the perspective of the system environment 1550, it is the controller 200 that has an account with the system environment 1550, and not the individual person operating the keyboard 120, aspects of that person's user account remain known only in the controller environment 1250, and not in the system environment 1550 where, possibly, malicious software may pass such information onward.

In various embodiments, and as previously discussed, the indications of keypresses and/or key releases may identify the ones of the keys 130 that have been pressed or released via scan codes. In alternative embodiments, the keys 130 may be identified by a binary code that identifies the text characters and control functions that have been entered through operation of the keys 130 of the keyboard 120, such as the American Standard Code for Information Interchange (ASCSII). In embodiments in which scan codes are employed, the storage 540 may further store mapping data 543 comprising data matching scan codes to text characters and control functions. The mapping data 543 is employed by the processor circuit 550 in executing a sequence of instructions of the operating system 545 to derive the text characters and control functions indicated by operation of the keyboard 120 as part of implementing a user interface by which an authorized user may interact with the system environment 1550.

Returning to FIG. 1, it should be noted that the control of access to an application and/or to data may not be limited to or may not involve either the local application 546 or the local data 548 (if either is present). More specifically, such access control may alternatively or additionally be applied to an application or data stored within a different storage device incorporated into another, remotely located computing device, such as a remote server 900. In various embodiments, the computing device 1000 may further comprise a network interface 590 enabling access by the computing device 1000 to other computing devices (e.g., the remote server 900) through a network (e.g., the Internet). In a remote environment 1950 made accessible to the computing device 1000 through the network interface 590, the remote server 900 may comprise a processor circuit 950, a storage 940 accessible to the processor circuit 950 and storing an operating system 945 and/or a security routine 942 executed by the processor circuit 950, and a remote storage 965 storing an application and/or data meant to be made available to an authorized user of the computing device 1000.

In some of these embodiments, the processor circuit 550 is caused by at least the security routine 542 to, itself, either allow or deny access to an application and/or data stored within the remote storage 965 in a manner substantially similar to the manner to what has been described in allowing or denying access to the local application 545 and/or the local data 548. In others of these embodiments, the processor circuit 550 is caused by at least the security routine 542 to relay indications of determinations received from and made by the controller 200 of whether a person operating the keyboard 120 is an authorized user of the computing device 1000, or not, thereby enabling the processor circuit 950 to independently respond to those determinations in acting to allow or deny access to an application and/or data stored within the remote storage 965.

Alternatively, in various embodiments, the controller 200 may directly signal the network interface 590 with determinations of whether a person operating the keyboard 120 is an authorized user of the computing device 1000, or not, thereby enabling the network interface 590 to independently respond to those determinations in acting to allow or deny access to a network to which the computing device 1000 is coupled through the network interface 590. As will be explained in greater detail, this more direct interaction between the controller 200 and the network interface 590 may be implemented as part of embodiments in which the controller 200 is provided with more direct access to various other portions of the electronic system 1000 such that operation of the system environment 1550 is more directly controlled from the controller environment 1250.

The network interface 590 comprises circuitry providing at least some of the requisite functionality to enable access to a network based on either a wired or wireless technology (e.g., incorporating one or more transceiver components). The network interface 590 may also be at least partially implemented with sequences of instructions of the operating system 545 executed by the processor circuit 550 (e.g., to implement one or more aspects of a protocol stack). Where the network to which the computing device 1000 is coupled through the network interface 590 entails the use of electrically and/or optically conductive cabling, such cabling may employ signaling and/or protocols conforming to any of a variety of industry standards, including without limitation, Ethernet (IEEE-802.3) or IEEE-1394. Alternatively, where the network to which the computing device 1000 is coupled through the network interface 590 entails the use of a wireless link, such a wireless link may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 3:
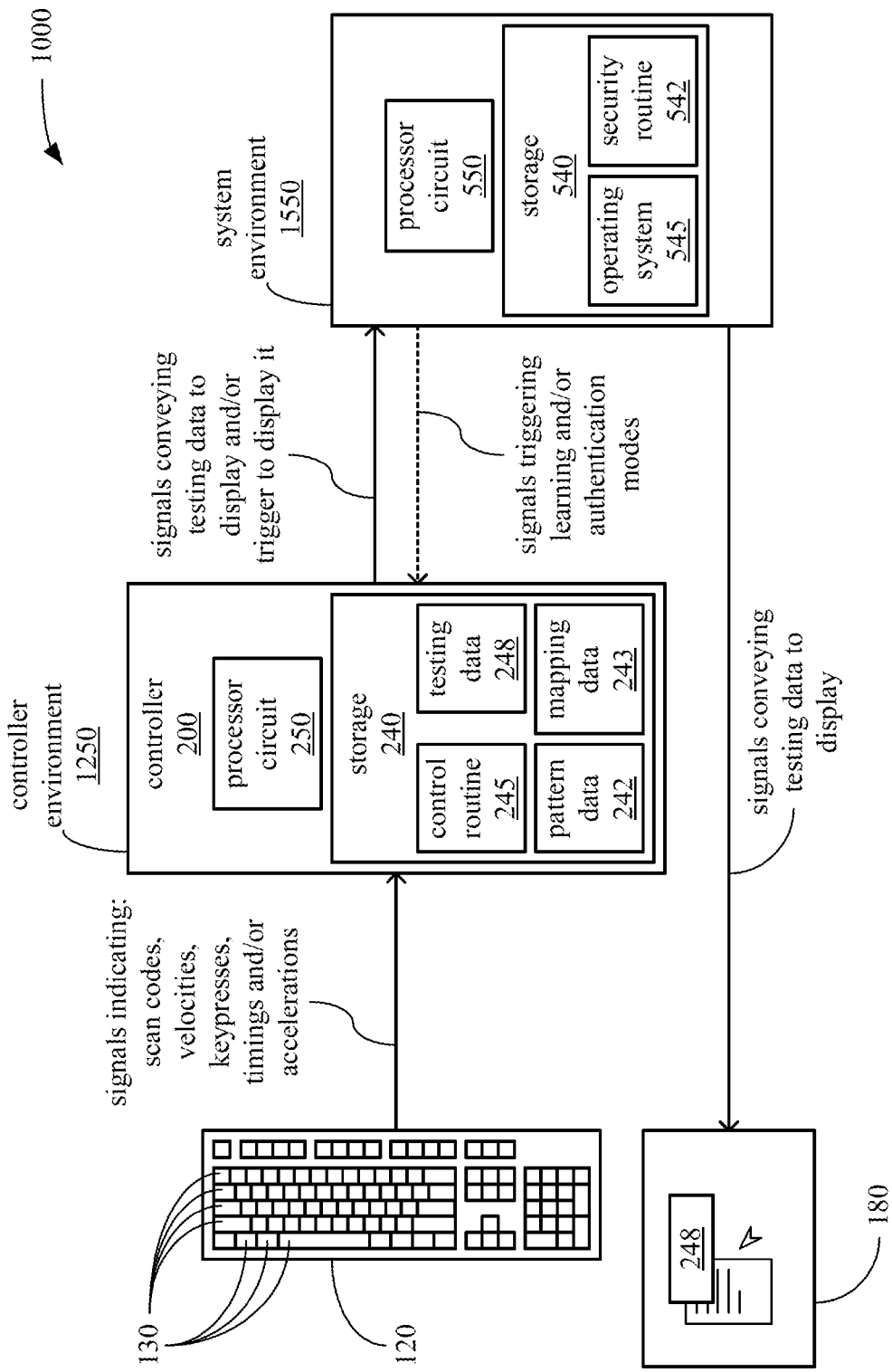
FIG. 3 illustrates a second portion of the embodiment of FIG. 1.

FIG. 3 illustrates a block diagram that is partially a subset of the block diagram of FIG. 1, and that also depicts details of the use of a display 180 along with the keyboard 120 and their interaction with both the controller environment 1250 and the system environment 1550. In various embodiments, at least the keyboard 120 and the display 180, together, provide a user interface in which the display 180 is also employed in authentication. The display 180 may be based on any of a variety of display technologies, including without limitation, a liquid crystal display (LCD), including touch-sensitive, color, and thin-film transistor (TFT) LCD; a plasma display; a light emitting diode (LED) display; an organic light emitting diode (OLED) display; a cathode ray tube (CRT) display, etc.

As previously discussed, in various embodiments, at a time when the controller 200 is operating in a learning mode, data concerning physical characteristics of a person operating the keyboard 120 may be received and stored by the controller as part of the pattern data 242 regardless of what that person types. In such embodiments, the controller 200 remains in the learning mode until sufficient text has been typed that sufficient data indicative of physical characteristics of the manner in which that person uses the keyboard 120 to enable recognition by the controller 200 in the future is able to be stored as part of the pattern data 242. Alternatively, and as will be explained in greater detail, the new authorized user may be presented with specific text to type as part of obtaining such sufficient data for storage as part of the pattern data 242.

In various embodiments where a person is allowed to type whatever they wish during the learning mode, whether sufficient data has been received from the keyboard 120 to enable sufficient data either to be stored as part of the pattern data 242 to enable that person to be later authenticated, or to be compared to the pattern data 242 during authentication may be determined through the setting of one or more thresholds. Having insufficient data stored as part of the pattern data 242 will likely impair any future effort at authentication, regardless of what an authorized user types during authentication, and having insufficient data received for comparison to the pattern data 242 during authentication will impair efforts at authentication at that time. Such a threshold may include, without limitation, a predetermined quantity of text characters typed, a predetermined quantity of words, a predetermined quantity of complete sentences, a predetermined percentage of the keys 130 of the keyboard 120 being used, etc. It is advantageous to have such data include physical characteristics of an authorized user's use of a larger quantity of different ones of the keys 130 of the keyboard 120, rather than a smaller quantity, to enhance the accuracy with which the controller 200 is able to distinguish that authorize user from others. It is also advantageous to have such data based on the use of numerous ones (if not all) of an authorized user's digits (or at least all of their fingers), and on the use of each of those digits in reaching ones of the keys 130 that are at different locations so as to cause each of those digits to be employed in reaching in different directions. Employing a greater variety of movement of a greater variety of an authorized user's digits draws out more of the uniqueness in the physical characteristics of the manner in which that authorized user operates the keyboard 120, thereby enhancing authentication accuracy.

Thus, in various embodiments, during at least some instances, it may be deemed desirable to provide a person operating the keyboard 120 with preselected text for them to type, instead of relying upon whatever that person chooses to type. Such preselected text is chosen to cause that person to make a wider variety of movements with more of their digits to reach a greater variety of the keys 130 in order to ensure that sufficient data indicative of the physical characteristics with which they operate the keyboard 120 is obtained. More specifically, the storage 240 may also store a testing data 248 that the processor circuit 250 is caused to convey by the control routine 245 from the controller environment 1250 to the system environment 1550 to be caused to be displayed on the display 180 by the processor circuit 550 under the control of at least the security routine 542. The testing data 248 comprises text that a person operating the keyboard 120 is prompted to type in order to cause that person to operate the keyboard in a manner that provides data that is sufficient for use in either learning the physical characteristics with which that person operates the keyboard 120 or to authenticate that person as either an authorized user, or not (i.e., causes that person to use at least a defined quantity of digits of their hands to operate at least a defined quantity of the keys 130 of the keyboard 120).

In some of these embodiments in which the testing data 248 is employed, the storage 240 may additionally store a mapping data 243 to enable the processor circuit 250 to match scan codes of the ones of the keys 130 that are pressed by a person being prompted with the testing data 248 to ensure that all of the testing data 248 is typed, and correctly, as part of ensuring that sufficient data is received. Alternatively, the testing data 248 may further comprise a listing of the scan codes of the ones of the keys 130 that are expected to be typed by someone being prompted with the text of the testing data 248 in order to ensure that all of that text is typed, and correctly, without requiring the processor circuit 250 to match the received scan codes to that text.

In various embodiments, at least a portion of the pattern data 242 indicating physical characteristics of the manner in which an authorized user operates the keyboard 120 is refined over time, rather than allowed to remain static since being stored during an instance of the controller 200 being in the learning mode. Such recurring refinement of such data may be carried out in recognition of the fact that various physical characteristics of the manner in which a person is able to move each of the digits of their hands changes as they age and in response to other events that may occur during their lifetimes, and such changes will result in changes in the physical characteristics of the manner in which they operate a keyboard.

In some of such embodiments, such refinement of such data may be carried out at a predetermined interval of time or other form of recurring interval that may be associated with frequency or extent of use of the computing device 1000 over time. At such an interval, the processor circuit 250, in executing the control routine 245, may place the controller 200 in a refinement mode in which, following authentication of an authorized user, data indicative of physical characteristics of the manner in which that authorized user currently operates the keyboard 120 may be employed to either adjust or replace data previously stored as part of the pattern data 242 concerning those physical characteristics. In some variants of these such embodiments, the authorized user may be prompted to type preselected text of the testing data 248 in order to ensure sufficiency of the data received from the keyboard 120, as previously discussed.

In others of such embodiments, various thresholds may be employed for rates of change of one or more physical characteristics, with those thresholds being selected to trigger entry into a refinement mode when physical characteristics of the manner in which an authorized user operates the keyboard 120 have changed enough to meet a defined threshold, but to avoid triggering entry into a refinement mode when those physical characteristics appear to have changed to such an extent that it is more likely that the apparent change is due to someone other than that authorized user operating the keyboard 120. In other words, one or more thresholds may be employed that are selected to enable detection of instances in which such physical characteristics of an authorized user have indeed changed to the extent that refinement is needed, while avoiding impairment in the accuracy with which an authorized user is distinguished from others.

As an alternative to the use of such thresholds, in others embodiments in which such refinement is performed, sequences of instructions of the control routine 245 may cause the processor circuit 250 to employ one or more forms of statistical and/or predictive analysis in performing such refinement of at least a portion of the pattern data 242, including without limitation, causing the processor circuit to implement a Bayesian inference engine. Indeed, in some of these embodiments, a Bayesian inference engine may be caused to be implemented by the processor circuit 250 to analyze data concerning physical characteristics of the manner in which a person operates the keyboard 120 during the learning mode to identify significant unique aspects of those physical characteristics that may be later employed in authenticating that person as an authorized user.

As has been discussed, one or more of the learning mode, the authentication mode and the refinement mode may be entered into under differing circumstances and/or triggered in different ways in various possible embodiments. As has also been discussed, the manner in which each of these modes is presented to a person desiring to use the computing device 1000 may differ among various possible embodiments.

In some embodiments, the learning, authentication and/or refinement modes may be presented in a manner similar to the manner in which each of the setting, using and changing of passwords is typically presented. In other words, in such embodiments, there may be a distinct "login screen" that the processor circuit 550 causes to be presented on the display 180 in a person desiring to make use of the electronic system 1000 is prompted to type text. That text may be preselected text of the testing data 248, as previously discussed. The login screen is presented at times when the computing device 1000 is in a locked mode in which much of the functionality of the computing device 1000, including access to applications and/or data (e.g., the local application 546, the local data 548, and/or applications or data stored within the remote storage 965), is not allowed (except for some limited amount of functionality still being provided to enable authentication, e.g., the keyboard 120). Such a login screen may also present that person one or more alternative ways to be authenticated as an authorized user of the computing device 1000, such as the use of a password, especially where a person who is an authorized user has not yet entered text during the learning mode such that the controller 200 would recognize them as an authorized user, or where the keyboard 120 is currently not coupled such that typing of text is not possible or is made more difficult (in embodiments in which the keyboard 120 is not integrated into the computing device 1000, as has been discussed).

In these embodiments, successful authentication of an authorized user (whether through typing text presented in the login screen, entering a password, etc.), the computing device 1000 enters an "unlocked" mode in which the authorized user is able to make use of its functionality. As is typical in implementations of security on many computing devices, the computing device 1000 may revert to the earlier locked mode if a predetermined period of time elapses since the authorized user last interacted with at least some portion of the computing device 1000.

However, while the computing device 1000 is in the unlocked mode, the user interface provided to the authorized user via at least the display 180 may present a selectable icon, a command line or other mechanism by which an authorized user who has not yet been made recognizable to the controller 200 may indicate that they wish to be made so recognizable such that the processor circuit 550 is caused by the security routine 542 to respond to that indication by signaling the controller 200 to enter the learning mode. Upon entry of the controller 200 into the learning mode, the security routine 542 may prompt that authorized user through the display 180 to begin entering text, perhaps text of that authorized user's choosing or preselected text (e.g., the previously discussed preselected text of the testing data 248).

Also, while the computing device 1000 is in the unlocked mode, the controller 200 may continue to be in the authentication mode, despite the authorized user having already been authenticated through use of the login screen, to continuously monitor data received from the keyboard 120 for a change in the physical characteristics of the manner in which the keyboard 120 is being operated that indicates that someone other than the authorized user is operating the keyboard 120. In response to such an indication of such a change in persons operating the keyboard 120, the controller 200 determines whether the person now operating the keyboard 120 is also an authorized user, or not, and provides a signal to the processor circuit 550 indicating the results of that determination. If the controller 200 determines that the person now operating the keyboard 120 is another authorized user, then the processor circuit 550 is caused by at least the security routine 542 to maintain the computing device 1000 in the unlocked mode. However, if the controller 200 determines that the person now operating the keyboard 120 is not an authorized user, then the processor circuit 550 is caused by at least the security routine 542 to place the computing device 1000 in the locked mode, perhaps once again causing the login screen to be presented on the display 180.

Further, while the computing device 1000 is in the unlocked mode, the controller 200 may signal the processor circuit 550 with an indication that one or more physical characteristics of the manner in which the authorized user is operating the keyboard 120 has changed, either in response to a change in those physical characteristics observed as the authorized user entered the text they were prompted to enter to be authenticated or in response to a change in those physical characteristics observed as the authorized user enters text as part of making use of the computing device 1000 while it is in the unlocked mode. In response to this indication from the controller 200, the processor circuit 550 may be caused by at least the security routine 542 to prompt the authorized user (perhaps through a "pop-up" window caused to be presented on the display 180) to enter preselected text (e.g., the preselected text of the testing data 248) or some other text to enable the controller 200 to refine at least a portion of the pattern data 242 pertaining to physical characteristics of the manner in which that authorized user operates the keyboard 120.

In other embodiments, the learning, authentication and/or refinement modes may be entered into in a manner more transparent to an authorized user of the computing device 1000, such that explicit prompts to the authorized user to take some particular action as part of maintaining security in the use of the computing device 1000 are minimized. In such other embodiments, what the processor circuit 550 is caused by at least the security routine 542 to present on the display 180 may change little in appearance between times when the computing device 1000 is in locked mode and is in unlocked mode.

More specifically, in these other embodiments, while in locked mode, the security routine 542 cooperates with at least the operating system 545 and/or one or more applications (e.g., the local application 546) to provide a person desiring to make use of the computing device 1000 a limited degree of access to the functionality of the computing device 1000. This limited degree of access includes access to some form of functionality provided by the operating system 545 and/or one or more applications that includes an opportunity during the locked mode for that person to begin entering text. Also while in locked mode, the security routine 542 signals the controller 200 to trigger its entry into the authentication mode, so that as to be ready to authenticate that person as being either an authorized user, or not, if they should make use of the opportunity to enter text.

As long as that person makes use of only the limited degree of access, and perhaps enters text such that authentication may be carried out, then the user experience provided to that person may remain transparent. However, should that person attempt to access an application or data that is not allowed to be accessed during the locked mode, then the processor circuit 550 may be caused by at least the security routine 542 to present a more explicit prompt for that person to enter text (perhaps a preselected text, such as the preselected text of the testing data 248) to more quickly enable authentication of that person as either an authorized user, or not. In some variants, that more explicit prompt may also offer one or more other ways by which that person may be authenticated, including without limitation, the use of a password. Again, the provision of an alternate way to be authenticated may be desirable to provide where that person has not yet entered text during the learning mode such that the controller 200 would recognize them, or where the keyboard 120 is currently not coupled.

Whether, in these other embodiments, authentication of that person as an authorized user is ultimately accomplished through the entry of text using the opportunity provided during the locked mode, through the entry of text in response to being explicitly prompted, or through some other way, such successful authentication as an authorized user results in the computing device 1000 being caused by the processor circuit 550 to enter the unlocked mode. Again, the unlocked mode is meant to appear little different from the locked mode, except that the now the processor circuit 550 is caused by at least the security routine 542 to provide greater access to applications and/or data to that person, now authenticated as an authorized user. By way of example, whereas that now authorized user was not able to access an email account through an email application of the computing device 1000 during the locked mode despite possibly being able to open the email application, the email account is allowed to be accessed during the unlocked mode. Also by way of example, while that now authorized user was not able to access content on a network to which the computing device 1000 may be coupled via the network interface 590 during the locked mode while yet being able to access publicly available content on the Internet, that content on that network may become accessible during the unlocked mode. Further by way of example, while data comprising addresses and phone numbers was remained encrypted (and thus, unreadable) during the locked mode, that data may become unencrypted during the unlocked mode.

Again, while the computing device 1000 is in the unlocked mode, the user interface provided to that now authorized user may present a selectable icon, a command line or other mechanism by which an authorized user who has not yet been made recognizable to the controller 200 may indicate that they wish to be made so recognizable such that the processor circuit 550 is caused by the security routine 542 to respond to that indication by signaling the controller 200 to enter the learning mode. Again, such an authorized user may be prompted to begin entering text, perhaps the reselected text of the testing data 248.

Also, again, while the computing device 1000 is in the unlocked mode, the controller 200 may continue to be in the authentication mode to continuously monitor data received from the keyboard 120 for a change in the physical characteristics of the manner in which the keyboard 120 is being operated that indicates that someone other than that now authorized user is operating the keyboard 120. Again, such a change in persons operating the keyboard 120 may be responded to with a continuance of being in the unlocked mode if it is determined that the person now operating the keyboard 120 is another authorized user, or such a change in persons may be responded to with return to being in the locked mode if it is determined that the person now operating the keyboard 120 is not an authorized user. In some variants where the locked mode has been so returned to, there may continue to be little change in appearance in what is presented on the display 180, while in other variants the fact that the locked mode has been returned to as a result of operation of the keyboard by someone who is not an authorized user may be accompanied with an explicit notice being presented on the display 180 to the effect that the computing device 1000 is now in the locked mode (perhaps with no applications or data being allowed to be accessed, at all).

Further, again, while the computing device 1000 is in the unlocked mode, the controller 200 may signal the processor circuit 550 with an indication that one or more physical characteristics of the manner in which that now authorized user is operating the keyboard 120 has changed, either in response to a change in those physical characteristics observed as that now authorized user entered the text they were prompted to enter to be authenticated or in response to a change in those physical characteristics observed as that now authorized user enters text as part of making use of the computing device 1000 while it is in the unlocked mode. Again, in response to this indication from the controller 200, the processor circuit 550 may be caused by at least the security routine 542 to prompt that now authorized user to enter text, perhaps the preselected text of the testing data 248, to enable the controller 200 to refine at least a portion of the pattern data 242 pertaining to physical characteristics of the manner in which that now authorized user operates the keyboard 120.

Still again, while the computing device 1000 is in the unlocked mode, the computing device 1000 may revert to the earlier locked mode if a predetermined period of time elapses since the authorized user last interacted with at least some portion of the computing device 1000. However, the computing device 1000 may further comprise one or more proximity sensors, perhaps as a component of the keyboard 120, that sense the presence or absence of a person in relatively close proximity to the computing device 1000 and which may signal the controller 200 (or other portion of the computing device 1000) to the effect that the person last authenticated as an authorized user never left the proximity of the computing device 1000 such that the computing device 1000 should refrain from reverting to the earlier locked mode, despite the lack of interaction.

It should be noted that although much of the discussion herein focuses on the use two operating environments in which one (e.g., the controller environment 1250) serves to control access by would-be users to the other (e.g., the system environment 1550), in various embodiments, the processor 250 may be caused (by execution of the control routine 245) to employ the characteristics with which a person operates the keyboard 120 to authenticate a person as being authorized to interact more directly with the controller environment 1250, instead of (or in addition to) the system environment 1550. As those familiar with setting up typical computing devices will readily recognize, many computing devices have a "setup" or "configuration" mode in which access is given to various menus or other mechanism to configure various aspects of the manner in which a computing device functions. Such settings are often independent of any operating system (e.g., the operating system 545), and indeed are often accessed and used in situations where a computing device is being readied for use at a stage when no operating system has yet been installed such that what there is to the system environment 1550 is not yet operable. Alternative or additionally, such a configuration or setup mode may provide access to a set of manually-selectable diagnostics routines and/or utilities (e.g., a routine to format a storage device for use).

Figure 4:
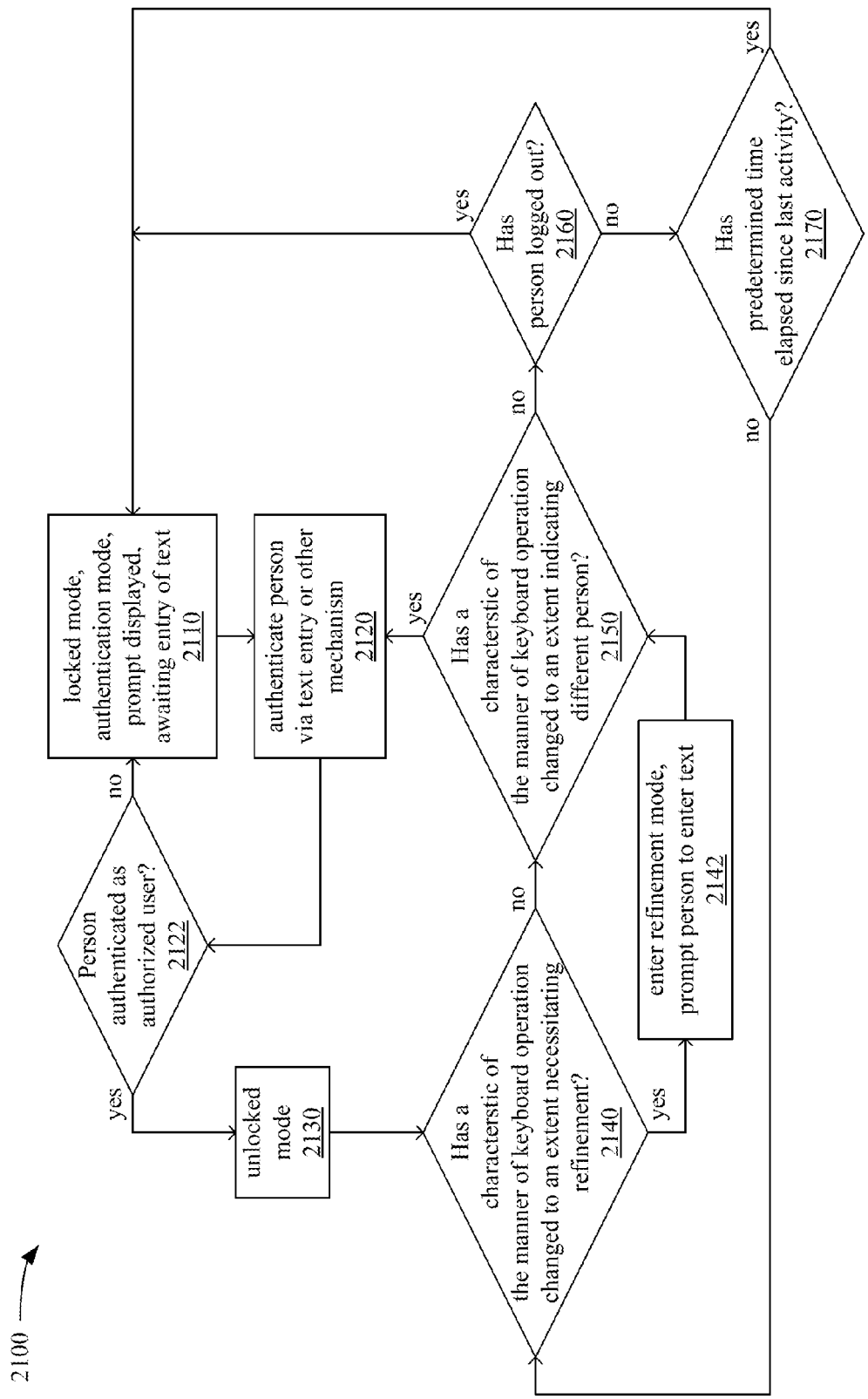
FIG. 4 illustrates an embodiment of a first logic flow.

FIG. 4 illustrates one embodiment of a logic flow 2100. The logic flow 2100 may be representative of some or all of the operations executed by one or more embodiments described herein. More specifically, the logic flow 2100 may illustrate operations performed by components of the computing device 1000, possibly including one or both of the processor circuits 250 and 550.

At 2110, a computing device (e.g., the computing device 1000) is in a locked mode in which a controller of the computing device (e.g., the controller 200) is in an authentication mode. In the locked mode, a prompt for a person to enter text is presented (perhaps visually on a display, such as the display 180), the text possibly being a preselected text (e.g., the preselected text of the testing data 248). In the authentication mode, the controller awaits entry of text from a keyboard (e.g., the keyboard 120) to enable the controller to authenticate a person operating the keyboard as either an authorized user of the computing device, or not, through comparison of physical characteristics of the manner in which that person operates the keyboard to stored physical characteristics of the manner in which one or more authorized users use the keyboard.

At 2120, in response to a person having entered text (or possibly made use of an alternate authentication mechanism, such as a password), that person is authenticated as being either an authorized user of the computing device, or not. If, at 2122, that person is determined to not be an authorized user, then the computing device remains in the locked mode and the controller of the computing device remains in the authentication mode at 2110. However, if at 2122, that person is determined to be an authorized user, then the computing device is placed in an unlocked mode at 2130 in which access is allowed to one or more applications and/or data to which access was not allowed during the locked mode.

At 2140, the controller determines whether or not one or more physical characteristics of the manner in which the person (now determined to be an authorized user) operates the keyboard has changed to an extent consistent with the degree of change expected to occur in such physical characteristics over time (perhaps simply as a result of aging) such that refinement of physical characteristics stored for that person is needed. If it is determined that such refinement is needed, then the controller enters a refinement mode at 2142 in which the person may be presented with a prompt to type text, perhaps a preselected text, to provide input indicative of the current physical characteristics with which the person now operates the keyboard.

Regardless of whether refinement was determined to be necessary, or not, a determination is made at 2150 by the controller of whether or not one or more of the physical characteristics of the manner in which the keyboard is being operated has changed to an extent indicating that a change has occurred in who is operating the keyboard. If it is determined that such a change has occurred, then the person now operating the keyboard is authenticated as being either an authorized user, or not, by the controller at 2120.

However, if it is determined that no such change in who is operating the keyboard has occurred, then a check is made at 2160 for whether or not the person has operated the keyboard (or some other component of a user interface of the computing device) to explicitly log out of using the computing device, thereby explicitly indicating that the computing device is to return to being in the locked mode at 2110.

However, if it is determined that the person has not logged out, then a check is made at 2170 for whether or not a predetermined period of time has elapsed since the computing device last detected activity indicative of the person continuing to use the computing device. If that period of time has elapsed, then it is taken as an indication that the person is no longer making use of the computing device, and the computing device returns to being in the locked mode at 2110. However, if that period of time has not elapsed, then it is taken as an indication that the person is likely still making some degree of use of the computing device, and a check is again made at 2140 by the controller for an indication of a change in the manner that the person operates the keyboard that is to an extent requiring entry into the refinement mode.

Despite the depiction of a specific order in which the determinations at 2140, 2150, 2160 and 2170 are made, it should be noted that these determinations are made repeatedly throughout the time that the computing device is in the unlocked mode, and that these determinations need not be made in any specific order. Furthermore, one or more of these determinations may be made substantially simultaneously.

Figure 5:
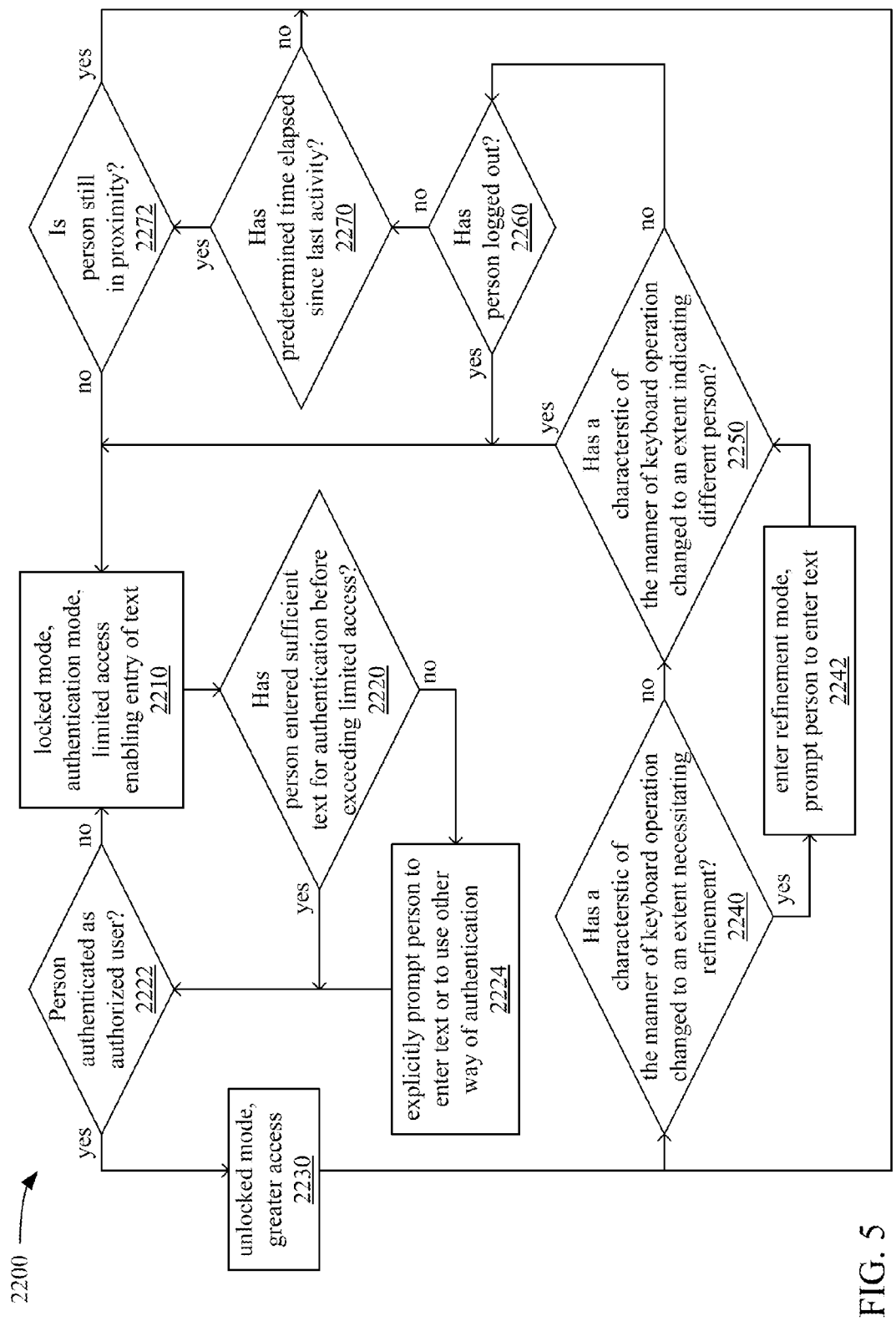
FIG. 5 illustrates an embodiment of a second logic flow.

FIG. 5 illustrates one embodiment of a logic flow 2200. The logic flow 2200 may be representative of some or all of the operations executed by one or more embodiments described herein. More specifically, the logic flow 2200 may illustrate operations performed by components of the computing device 1000, possibly including one or both of the processor circuits 250 and 550.

At 2210, a computing device (e.g., the computing device 1000) is in a locked mode in which a controller of the computing device (e.g., the controller 200) is in an authentication mode. In the locked mode, a prompt a person is allowed access to a limited subset of otherwise available functionality of the computing device, perhaps being allowed to make some limited use of one application while being denied access to another application, and/or perhaps being allowed to access some data that may be deemed to already be in the public domain while being denied access to other data that isn't. Among the limited subset of functionality to which a person is allowed access in the locked mode is an application (e.g., a text editor or word processing application) that affords a person an opportunity to enter text. In the authentication mode, the controller awaits entry of text from a keyboard (e.g., the keyboard 120) by a person making use of that opportunity to enter text to enable the controller to authenticate that person as either an authorized user of the computing device, or not, through comparison of physical characteristics of the manner in which that person operates the keyboard to stored physical characteristics of the manner in which one or more authorized users use the keyboard.

At 2220, if the person has made sufficient use of the opportunity to enter text such that they have entered sufficient text to enable authentication before that person attempts to access an application or data to which access is not allowed, then authentication is performed by the controller. However, if that person does not enter sufficient text before attempting such access (perhaps attempting such access before entering any text), then that person is explicitly prompted (perhaps visually on a display of the computing device, e.g., the display 180) to enter text (or possibly to make use of an alternate mechanism of authentication) at 2224. In that prompting the person may be presented with a preselected text to enter (e.g., the preselected text of the testing data 248).

With or without such prompting, the person is authenticated as being either an authorized user of the computing device, or not, at 2222. If that person is determined to not be an authorized user, then the computing device remains in the locked mode and the controller of the computing device remains in the authentication mode at 2210. However, if that person is determined to be an authorized user, then the computing device is placed in an unlocked mode at 2230 in which access is allowed to one or more applications and/or data to which access was not allowed during the locked mode.

At 2240, the controller determines whether or not one or more physical characteristics of the manner in which the person (now determined to be an authorized user) operates the keyboard has changed to an extent consistent with the degree of change expected to occur in such physical characteristics over time (perhaps simply as a result of aging) such that refinement of such physical characteristics stored for that person is needed. If it is determined that such refinement is needed, then the controller enters a refinement mode at 2242 in which the person may be presented with a prompt to type text, perhaps a preselected text, to provide input indicative of the current physical characteristics with which the person now operates the keyboard.

Regardless of whether refinement was determined to be necessary, or not, a determination is made at 2250 by the controller of whether or not one or more of the physical characteristics of the manner in which the keyboard is being operated has changed to an extent indicating that a change has occurred in who is operating the keyboard. If it is determined that such a change has occurred, then the computing device reverts to being in the locked mode at 2210.

However, if it is determined that no such change in who is operating the keyboard has occurred, then a check is made at 2260 for whether or not the person has operated the keyboard (or some other component of a user interface of the computing device) to explicitly log out of using the computing device, thereby explicitly indicating that the computing device is to return to being in the locked mode at 2210.

However, if it is determined that the person has not logged out, then a check is made at 2270 for whether or not a predetermined period of time has elapsed since the computing device last detected activity indicative of the person continuing to use the computing device. If that period of time has elapsed, then a check is made at 2272 as to whether one or more sensors has detected the continued presence of the person during the predetermined period of time. If both the predetermined period of time has elapsed, and the person is not in the proximity of the computing device, then it is taken as an indication that the person is no longer making use of the computing device, and the computing device returns to being in the locked mode at 2210. However, if that period of time has not elapsed, or if the one or more sensors has detected the continued presence of the person during the predetermined period of time, then it is taken as an indication that the person is likely still making some degree of use of the computing device, and a check is again made at 2240 by the controller for an indication of a change in the manner that the person operates the keyboard that is to an extent requiring entry into the refinement mode.

Despite the depiction of a specific order in which the determinations at 2240, 2250, 2260 and 2270 are made, it should be noted that these determinations are made repeatedly throughout the time that the computing device is in the unlocked mode, and that these determinations need not be made in any specific order. Furthermore, one or more of these determinations may be made substantially simultaneously.

Figure 6:
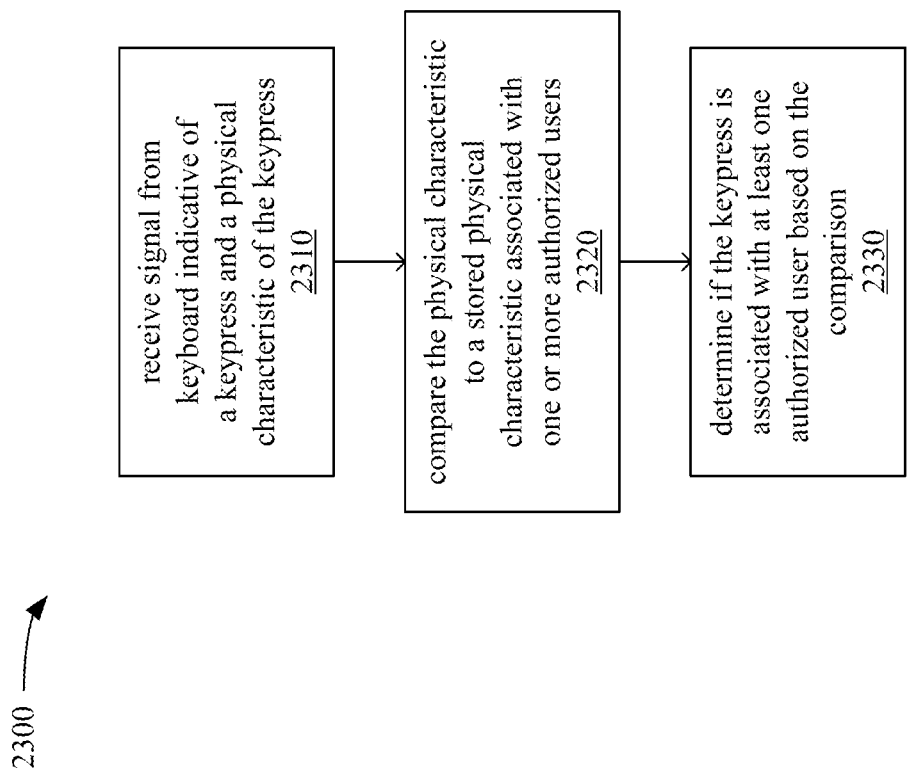
FIG. 6 illustrates an embodiment of a third logic flow.

FIG. 6 illustrates one embodiment of a logic flow 2300. The logic flow 2300 may be representative of some or all of the operations executed by one or more embodiments described herein. More specifically, the logic flow 2300 may illustrate operations performed by components of the computing device 1000, possibly including one or both of the processor circuits 250 and 550.

At 2310, while a component of a computing device (e.g., the processor circuit 250 of computing device 1000, amidst executing the control routine 245) is in an authentication mode, awaiting a signal from a keyboard communicatively coupled to that computer device (e.g., the keyboard 120) indicating that at least one key of that keyboard (e.g., one of the keys 130) has been pressed, and indicating at least one physical characteristics of the manner in which that key at least one key was pressed. As previously discussed, the manner in which the signal is conveyed from that keyboard may be a digital serial transmission of a message comprising a series of bits identifying the at least one key with a scan code and conveying the at least one physical characteristic as a binary value specifying a range (e.g., a value for a velocity, a pressure, etc.).

At 2320, the component of the computing device compares the at least one physical characteristic to at least one stored physical characteristic associated with one or more users authorized to use the computing device (the at least one stored physical characteristic possibly being stored as part of the pattern data 242 stored within the storage 240). As previously discussed, the at least one stored physical characteristic may be stored in an operating environment that is maintained separately from another operating environment meant to be made accessible for use by an authorized user of the computing device.

At 2330, the component of the computing device determines if the keypress is associated with at least one authorized user of the computing device based on that comparison. As previously discussed, the determination may be conveyed by the component from within one operating environment to a processor circuit within another operating environment, that again, is maintained separately from the operating environment in which the at least stored physical characteristic is maintained.

Figure 7:
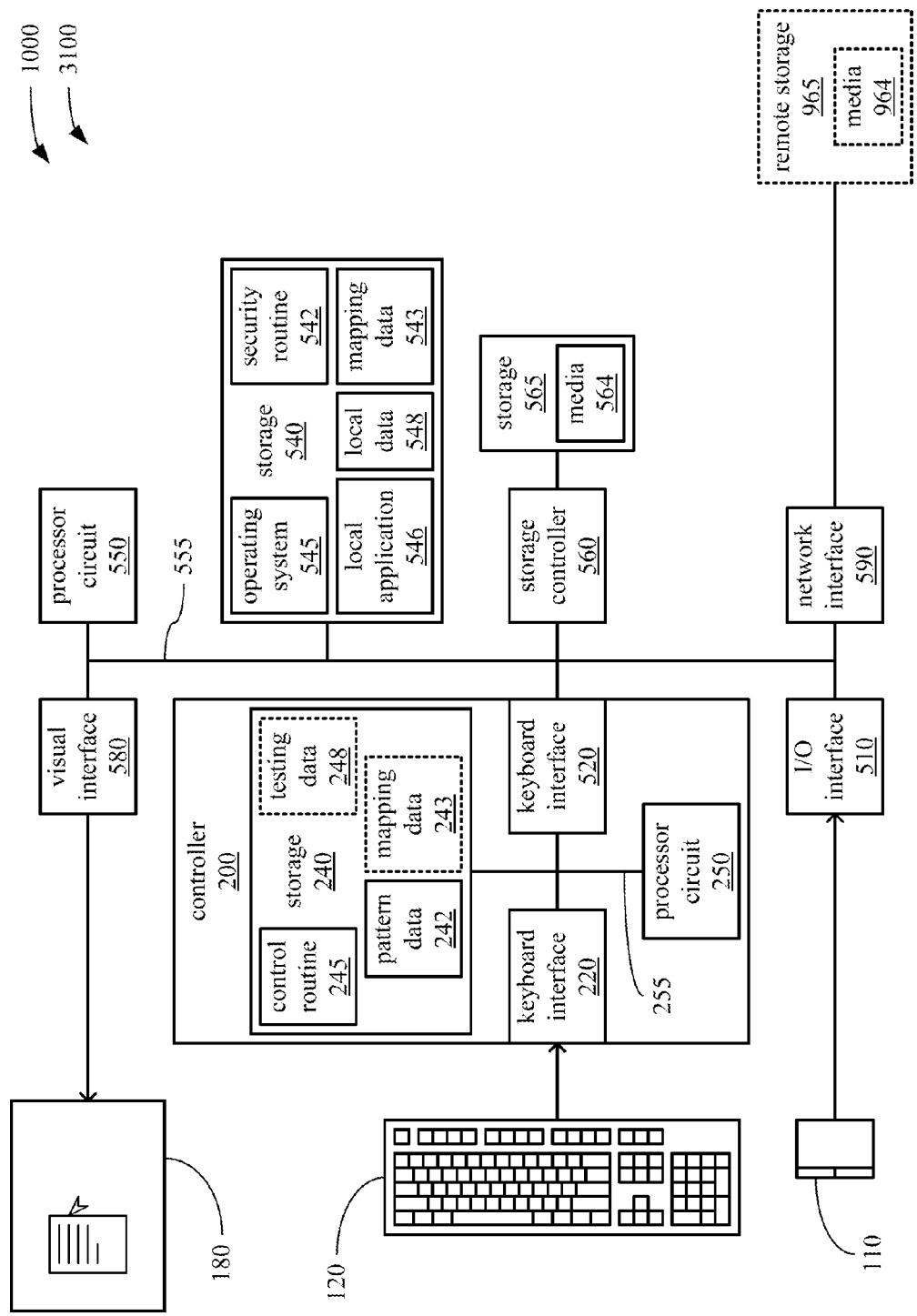
FIG. 7 illustrates an embodiment of a first processing architecture.

FIG. 7 illustrates an embodiment of an exemplary processing architecture 3100 suitable for implementing various embodiments as previously described. More specifically, in one embodiment, the processing architecture 3100 may comprise or be implemented as part of one or more of the various aforedescribed embodiments of the computing device 1000.

The processing architecture 3100 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor circuit, the processor circuit itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3100, the computing device 1000 comprises at least the processor circuit 550, the storage 540, the controller 200 and coupling 555. As will be discussed, the computing device may further comprise an input/output (I/O) interface 510, a storage controller 560, a storage 565, a visual interface 580 and/or the network interface 590. In turn, the controller 200 comprises at least the processor circuit 250, the storage 240, a keyboard interface 220 and coupling 255. As has been discussed, the controller 200 may further comprise the keyboard interface 520. Within the storage 540 is stored at least the security routine 542, and has been previously discussed, the storage 540 may also store the operating system 545, the mapping data 543, the local application 546 and/or the local data 548. Within the storage 240 is stored at least the control routine 245 and the pattern data 242, and has been previously discussed, the storage 240 may also store the testing data 248 and/or the mapping data 243.

Coupling 555 is comprised of one or more buses, transceivers, buffers, crosspoint switches, and/or other conductors and/or logic that couples at least the processor circuit 550 to the storage 540 and the controller 200. Coupling 555 may further couple the processor circuit 550 to one or more of the I/O interface 510, the storage controller 560, the storage 565, the visual interface 580, and the network interface 590 (depending on which of these are also present). Similarly, coupling 255 is comprised of one or more buses, transceivers, buffers, crosspoint switches, and/or other conductors and/or logic that couples at least the processor circuit 250 to the storage 240 and the keyboard interface 220. Coupling 255 may further couple the processor circuit 250 to the keyboard interface 520 in embodiments in which the keyboard interface is present and is at least partially implemented with digital circuitry. With each of the processor circuits 250 and 550 being so coupled by couplings 255 and 555, respectively, the processor circuits 250 and 550 are able to perform the various tasks in response to executing sequences of instructions of at least the control routine 245 and the security routine 542, respectively, as has been described at length, above. Each of the couplings 255 and 555 may be implemented with any of a variety of technologies or combinations of technology by which signals are optically and/or electrically conveyed. Further, at least portions of one or both of couplings 255 and 555 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCM-CIA) bus, HyperTransport™, QuickPath, and the like.

As previously discussed, each of the processor circuits 250 and 550 may comprise any of a wide variety of commercially available processors, and each of the storages 240 and 540 may comprise any of a wide variety of types of storage device. Again, it should be noted that although each of the storages 240 and 540 are depicted as a single block in FIG. 7, either or both may comprise more than one distinct storage device that may be based on differing storage technologies. However, as depicted, a distinction is made between the storage 540 and the storage 565, the storage 565 being explicitly coupled to coupling 555 through the storage controller 560. This depiction is in recognition of the commonplace use of one type of device providing relatively rapid reading and relatively rapid writing capabilities such that the processor circuit 550 enabling more rapid manipulation of data (but possibly using a "volatile" technology such that what is stored therein is lost with a loss of power), alongside use of another type of storage device providing relatively high density of non-volatile storage (but likely using a technology that provides somewhat slower reading and writing capabilities). Thus, in embodiments in which the storage controller 560 and the storage 565 are present, one or more of the security routine 542, the mapping data 543, the operating system 545, the local application 546 and/or the local data 548 may initially be stored within the storage 565, and then copied into the storage 540 for more rapid access by the processor circuit 550. Any of a variety of interface technologies may be employed in coupling the storage controller 560 to the storage 565 in which timings and/or protocols may be employed that conform to one or more industry standards, including without limitation, USB and IEEE 1394.

Further, one or both of the storages 540 and 565 may comprise articles of manufacture in the form of a computer-readable storage medium to store logic, such as a media 564 of which the storage 565 may be comprised. Examples of a computer-readable storage medium (e.g., the media 564) may include any tangible media capable of storing electronic data, including without limitation, volatile memory or non-volatile memory, removable or non-removable memory, erasable or non-erasable memory, writeable or re-writeable memory, and so forth. More specifically, where such a distinction as has been described above is made between the storages 540 and 560, the storage 565 may comprise a hard disk drive (HDD), a magnetic floppy drive (FDD), or an optical disk drive (e.g., a CD-ROM or DVD drive); and correspondingly, the media 564 may comprise one or more hard disk platters, a floppy diskette, or an optical disk, respectively. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

As previously discussed, and where present, the network interface 590 comprises circuitry providing at least some of the requisite functionality to enable access to a network based on either a wired or wireless technology, and may also be at least partially implemented with sequences of instructions of the operating system 545 executed by the processor circuit 550. As also previously discussed, the network to which the computing device 1000 is coupled through the network interface 590 may entails the use of any of a variety of types of conductive cabling or wireless linkage employing signaling and/or protocols that may conform to any of a wide variety of industry standards.

Where present, the I/O interface 510 provides any of a variety of types of input/output interface employing any of a variety of forms of wired or wireless signaling to enable the coupling of various input and/or output devices to the computing device 1000 such that the processor circuit 550 is able to interact with those input and/or output devices through the I/O interface 510. As depicted, the I/O interface 510 couples an additional user input device 110 (i.e., a user input device other than the keyboard 520) to the computing device 1000, which as depicted, is a touchpad. Other examples of input and/or output device that may be coupled to the computing device 1000 through the I/O interface 510 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, etc. The wired and/or wireless signaling technologies employed by the I/O interface 510 in coupling such devices to the computing device 1000 may employ signaling and/or protocols that conform to any of a variety of industry standards, including without limitation, IEEE 1284 (more commonly referred to as a "parallel port interface"), RS-232C, RS-422, IEEE 1394, USB, AccessBus, etc.

Where present, the visual interface 580 provides any variety of types of interface employing any of a variety of forms of signaling to couple the display 180 to the computing device to convey images to the display 180 to be visually presented thereon, including the various prompts and/or preselected text previously discussed. The wired and/or wireless signaling technologies employed by the visual interface 580 in coupling the display 180 to the computing device 1000 may employ signaling and/or protocols that conform to any of a variety of industry standards, including without limitation, any of a variety of analog video interfaces, Digital Video Interface (DVI), DisplayPort, etc.

Turning to the controller 200, the keyboard interface 220 employs a multitude of conductors in its coupling to the keyboard 120, thereby forming a relatively direct coupling to the keys 130 of the keyboard 120, along with whichever ones of the detectors 131-133 that may be present. This enables the controller 200 to more directly receive indications of keypresses and key releases in a manner enabling the controller 200 to more accurately determine the timings of these events, along with more directly receiving indications of velocities and/or pressures employed in a person operating the keys 130, as has been previously discussed in detail.

Further, in embodiments in which the keyboard interface 520 is implemented by the controller 200 in circuitry and/or via execution of the control routine 245, the controller 200 presents data indicating keypresses (and perhaps, also key releases) to the processor circuit 550 in a manner that mimics a long used form of keyboard interface that the operating system 545 may have been written with the assumption of being provided. As previously discussed, while the controller 200 relays data indicating keypresses (and perhaps, also key releases) to the processor circuit 550, the controller does not relay data indicating physical characteristics of the manner in which the keyboard 120 is operated (e.g., velocities and pressures).

Figure 8:
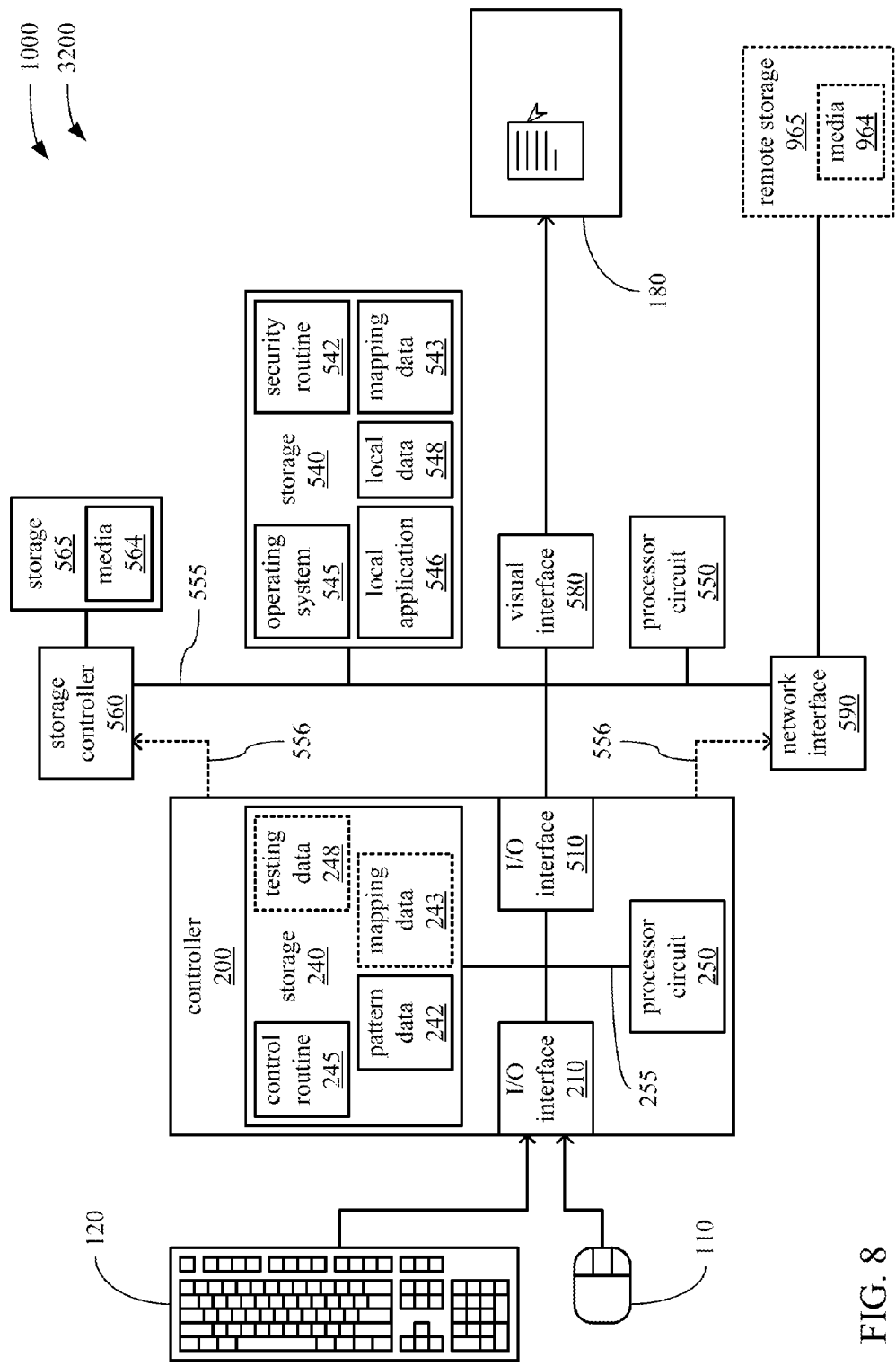
FIG. 8 illustrates an embodiment of a second processing architecture.

FIG. 8 illustrates an embodiment of an exemplary processing architecture 3200 suitable for implementing various embodiments as previously described. More specifically, in one embodiment, the processing architecture 3200 may comprise or be implemented as part of one or more of the various aforedescribed embodiments of the computing device 1000.

The processing architecture 3200 is similar to the processing architecture 3100 of FIG. 1. in many ways, and has been previously stated, like reference numerals are used to refer to like elements throughout. As depicted, in implementing the processing architecture 3200, the computing device 1000 comprises at least the processor circuit 550, the storage 540, the controller 200 and coupling 555. Also as depicted, the computing device may further comprise a storage controller 560, a storage 565, a visual interface 580, the network interface 590 and/or sideband couplings 556. In turn, as depicted, the controller 200 comprises at least the processor circuit 250, the storage 240, an I/O interface 210 and coupling 255. Also as depicted, the controller 200 may further comprise the I/O interface 510. Within the storage 540 is stored at least the security routine 542, and has been previously discussed, the storage 540 may also store the operating system 545, the mapping data 543, the local application 546 and/or the local data 548. Within the storage 240 is stored at least the control routine 245 and the pattern data 242, and has been previously discussed, the storage 240 may also store the testing data 248 and/or the mapping data 243.

One difference in the processing architecture 3200 from the processing architecture 3100 is that the controller 200 in the processing architecture 3200 may comprise the I/O interface 510 in place of the keyboard interface 520 such that the controller 200 emulates or simulates the presence of the I/O interface 510 in a manner similar to what has been described with regard to the keyboard interface 520. Correspondingly, another difference is that the controller 200 in the processing architecture 3200 comprises the I/O interface 210 in place of the keyboard interface 220.

These specific differences reflect a larger difference in the processing architecture 3200 from the processing architecture 3100 in which the keyboard 120 is not as directly coupled to the controller 200, and is instead, coupled to the controller 200 through either a wired or wireless digital serial interface in which indications of keypresses, key releases, velocities and/or pressures are received by the controller 200 as messages comprised of signals representing bits that are digitally serially conveyed to the controller 200 by the keyboard 120. Further, as suggested by the coupling of the additional user input device (which as depicted, is a mouse in FIG. 8) may employ the same type of wired or wireless digital serial interface as the keyboard 120. As previously discussed, such a digital serial interface may be based on any of a variety of cabling-based or wireless technologies, and may employ signaling and/or protocols conforming any of a wide variety of industry standards.

Where the digital serial interface is (to at least some degree) an implementation of USB, then mimicking the I/O interface 510 in a manner that presents what appears to be a longstanding implementation of a USB interface controller to accommodate assumptions made in the creation of the operating system 545 may entail hiding aspects of the identity or range of capabilities of the keyboard 120 from the processor circuit 550. More precisely, such mimicry may include presenting the keyboard 120 in a manner that it is perceived in the system environment 1550 as being an ordinary text entry keyboard coupled to the computing device 1000 via a USB cable and identifying itself solely as a "human interface device" for text entry, rather than being a keyboard capable of providing data concerning physical characteristics of the manner in which it is operated. Thus, presenting such a false indication of the nature and capabilities of the keyboard 120 may be part of what is required to maintain sufficient separation between the operating environments 1250 and 1550 as to maintain security, especially of data concerning the manner in which one or more persons operate the keyboard 120.

Still another difference in the processing architecture 3200 from the processing architecture 3100 is that the controller 200 may be further coupled to one or both of the storage controller 560 and the network controller 590 via sideband couplings 556, enabling an exchange of signals between the controller 200 and one or both of the storage controller 560 and the network controller 590 without employing coupling 555.

This specific difference reflects another larger difference in the processing architecture 3200 from the processing architecture 3100 in which the controller 200 may perform a greater range of functions in the processing architecture 3200. Such a greater range of functions may include more directly controlling more aspects of securing applications and/or data either stored within the computing device 1000 or to which the computing device 1000 has access. Through such more direct access, the controller 200, in response to determining that a person operating the keyboard is not an authorized user, may more directly signal the storage controller 560 to deny access to applications and/or data stored within the storage 565 and/or may more directly signal the network interface 590 to deny access to whatever network the computing device 1000 may be coupled to through the network interface 590. Further, it may be that one or more of the control routine 245, the testing data 248 and the mapping data 243 are obtained by the controller 200 from one or the other of storage 565 or the remote storage 965, and then stored in the storage 240. More specifically, the processor circuit 250 may be caused by the control routine 245 to directly signal one or both of the storage controller 560 and the network interface 590 to retrieve an updated version of the control routine 245, the testing data 248 and/or the mapping data 243 from a portion of the media 564 or 964 that is not accessible to the processor circuit 550.

Yet further, having such a form of more direct access to the network 590 enables other additional security features to be implemented. As previously discussed, a second layer of security, perhaps entail the use of encryption and/or the mimicry of seeking authentication as a person by the controller 200, may be employed between the operating environments 1250 and 1550 in some embodiments. With the network 590 being made more directly accessible to the controller 200, such a second layer of security could be implemented between the controller environment 1250 and the remote environment 1950 of the remote server 900 in which, after authenticating a person operating the keyboard 120 as an authorized user, the processor 250 may be caused to more directly operate the network interface 590 to present itself to the remote server 900 as a would-be user seeking to be authenticated as an authorized user.

Alternatively or additionally, where it is deemed that the security of a network between the computing device 1000 and the server 900 is sufficient that the transmission of data representing patterns with which people operate keyboards is able to be done with a sufficient degree of security, it may be that the pattern data 242 is stored in the storage 940 of the remote server 900, instead of in the storage 240 of the controller 200. In this arrangement, either data representing characteristics with which a person operates the keyboard 120 is transmitted by the controller 200 through the network interface 590 to the remote server 900 to be compared to the pattern data 242 by the processor circuit 950, or the pattern data 242 may be received by the controller 200 from the remote server 900 through the network interface 590. Either way, the ability of the controller 200 to more directly operate the network interface 590 in either of such exchange of data is relied upon to keep such data isolated from the system environment 1550.

The various elements of the computing device 1000 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example computer-implemented method comprises receiving a signal indicative of a keypress of at least one key of a keyboard communicatively coupled to a computing device, and indicative of at least one physical characteristic associated with the keypress; comparing the at least one physical characteristic to at least one stored physical characteristic associated with at least one authorized user of the computing device; and determining if the keypress is associated with at least one authorized user of the computing device based on the comparison.

The above example computer-implemented method, the at least one physical characteristic being selected from a group comprising a velocity at which the key is pressed, a pressure exerted to press the key, an amount of time during which the key is held in a fully pressed state, a pressure exerted to hold the key in the fully pressed state, a velocity at which the key is released from the fully pressed state, and an amount of time elapsing from pressing the key to pressing another key.

Either of the above examples of computer-implemented methods, the receiving of the signal from the keyboard comprising receiving a digitally serially transmitted message from the keyboard.

Any of the above examples of computer-implemented methods, comprising presenting a visual prompt on a display of the computing device requesting a user of the computing device to enter text to enable authentication prior to the user being authenticated as an authorized user.

Any of the above examples of computer-implemented methods, the visual prompt comprising a preselected text to enter.

Any of the above examples of computer-implemented methods, the preselected text being selected to cause a user to use a predetermined quantity of digits to operate a predetermined quantity of keys of the keyboard.

Any of the above examples of computer-implemented methods, comprising placing the computing device in an unlocked mode allowing access to a first data in response to determining that the keypress is associated with at least one authorized user and in response to the computing device being in a locked mode denying access to the first data.

Any of the above examples of computer-implemented methods, comprising allowing access to a limited subset of available functionality of the computing device during the locked mode, the limited subset of available functionality comprising an opportunity to enter text.

Any of the above examples of computer-implemented methods, comprising presenting a visual prompt on a display of the computing device requesting a user of the computing device to enter text in response to the user attempting to access the first data while the computing device is in the locked mode, the visual prompt comprising a preselected text to enter.

Any of the above examples of computer-implemented methods, comprising placing the computing device in the locked mode in response to determining that the at least one physical characteristic has changed since a last authentication of an authorized user to an extent consistent with a different user operating the keyboard in place of the authorized user; and determining that the different user is not an authorized user.

Any of the above examples of computer-implemented methods, comprising placing the computing device in the locked mode in response to a predetermined period of time having elapsed since the computing device was last interacted with by an authorized user.

Any of the above examples of computer-implemented methods, comprising refining the at least one stored physical characteristic in response to determining that the at least one physical characteristic has changed to an extent consistent with a physical change of an authorized user.

An example machine-readable medium comprising a sequence of instructions that when executed by a computing device, causes the computing device to carry out any of the above examples of computer-implemented methods.

An example apparatus comprises a first processor circuit; and a first storage communicatively coupled to the first processor circuit and storing a first sequence of instructions that when executed by the first processor circuit, causes the first processor circuit to: receive a signal indicative of a keypress of at least one key of a keyboard communicatively coupled to the apparatus, and indicative of at least one physical characteristic associated with the keypress; compare the at least one physical characteristic to at least one stored physical characteristic associated with at least one authorized user of the apparatus; and determine if the keypress is associated with at least one authorized user of the apparatus based on the comparison.

The above example apparatus, the at least one physical characteristic being selected from a group comprising a velocity at which the key is pressed, a pressure exerted to press the key, an amount of time during which the key is held in a fully pressed state, a pressure exerted to hold the key in the fully pressed state, a velocity at which the key is released from the fully pressed state, and an amount of time elapsing from pressing the key to pressing another key.

Either of the above examples of apparatus, the keyboard being communicatively coupled to the apparatus through an interface through which the apparatus receives the signal from the keyboard as a digitally serially transmitted message from the keyboard.

Any of the above examples of apparatus, comprising the keyboard, a plurality of keys of the keyboard being directly scanned by the apparatus.

Any of the above examples of apparatus, the first processor circuit being caused by executing the first sequence of instructions to cause a visual prompt to be presented on a display requesting a user of the apparatus to enter text to enable authentication prior to the user being authenticated as an authorized user.

Any of the above examples of apparatus, the visual prompt comprising a preselected text to enter.

Any of the above examples of apparatus, the preselected text being selected to cause a user to use a predetermined quantity of digits to operate a predetermined quantity of keys of the keyboard.

Any of the above examples of apparatus, the first processor circuit being caused by executing the first sequence of instructions to cause the apparatus to be placed in an unlocked mode allowing access to a first data in response to determining that the keypress is associated with at least one authorized user and in response to the apparatus being in a locked mode denying access to the first data.

Any of the above examples of apparatus, the first processor circuit being caused by executing the first sequence of instructions to cause access to be allowed to a limited subset of available functionality of the apparatus during the locked mode, the limited subset of available functionality comprising an opportunity to enter text.

Any of the above examples of apparatus, the first processor circuit being caused by executing the first sequence of instructions to cause a visual prompt to be presented on a display requesting a user of the apparatus to enter text in response to the user attempting to access the first data while the apparatus is in the locked mode, the visual prompt comprising a preselected text to enter.

Any of the above examples of apparatus, the first processor circuit being caused by executing the first sequence of instructions to cause the apparatus to be placed in the locked mode in response to the first processor circuit being caused to determine that the at least one physical characteristic has changed since a last authentication of an authorized user to an extent consistent with a different user operating the keyboard in place of the authorized user, and the first processor circuit being caused to determine that the different user is not an authorized user.

Any of the above examples of apparatus, the first processor circuit being caused by executing the first sequence of instructions to cause the apparatus to be placed in the locked mode in response to a predetermined period of time having elapsed since the apparatus was last interacted with by an authorized user.

Any of the above examples of apparatus, the first processor circuit being caused by executing the first sequence of instructions to refine the at least one stored physical characteristic in response to determining that the at least one physical characteristic has changed to an extent consistent with a physical change of an authorized user.

Any of the above examples of apparatus, comprising the display, a second processor circuit, and a second storage communicatively coupled to the second processor circuit and storing a second sequence of instructions, the first processor circuit causing a visual prompt to be presented comprises the first processor circuit being caused by executing the first sequence of instructions to signal the second processor circuit, and the second processor circuit being caused by executing the second sequence of instructions to present the visual prompt on the display in response to the signal.

Any of the above examples of apparatus, comprising a second processor circuit, and a second storage communicatively coupled to the second processor circuit and storing a second sequence of instructions, the first processor circuit causing the apparatus to be placed in one of the locked mode and the unlocked mode comprises the first processor circuit being caused by executing the first sequence of instructions to signal the second processor circuit, and the second processor circuit being caused by executing the second sequence of instructions to place the apparatus in one of the locked mode and the unlocked mode in response to the signal.

Another example apparatus comprises a first processor circuit; a second processor circuit; a first storage communicatively coupled to the first processor circuit and storing a first sequence of instructions that when executed by the first processor circuit, causes the first processor circuit to: receive a signal indicative of a keypress of at least one key of a keyboard communicatively coupled to the apparatus, and indicative of at least one physical characteristic associated with the keypress, compare the at least one physical characteristic to at least one stored physical characteristic associated with at least one authorized user of the apparatus, determine if the keypress is associated with at least one authorized user of the apparatus based on the comparison, and signal the second processor circuit to place the apparatus in an unlocked mode allowing access to a first data in response to determining that the keypress is associated with at least one authorized user and in response to the apparatus being in a locked mode denying access to the first data; and a second storage communicatively coupled to the second processor circuit and storing a second sequence of instructions that when executed by the second processor circuit, causes the second processor circuit to place the apparatus in the unlocked mode in response to receiving the signal from the first processor circuit to place the apparatus in the unlocked mode.

The above other example apparatus, the first processor circuit being caused by executing the first sequence of instructions to signal the second processor circuit to present a visual prompt on a display requesting a user of the apparatus to enter text, and the second processor circuit being caused by executing the second sequence of instructions to present the visual prompt on the display in response to receiving the signal from the first processor circuit to present the prompt on the display.

The invention claimed is:

1. A computer-implemented method comprising:
    allowing access to a limited subset of available functionality of a computing device, the limited subset of available functionality comprising access to an application of the computing device that provides an opportunity to enter text;
    sending a control signal to a display to cause the display to present a visual prompt requesting a user of the computing device to enter a preselected text;
    receiving signals indicative of keypresses to enter the text at a keyboard communicatively coupled to the computing device, the signals comprising indications of at least one physical characteristic associated with the keypresses and scan codes associated with the keypresses;

determining whether the scan codes associated with the keypresses match a set of mapping data, the set of mapping data comprising indications scan codes associated with the preselected text and an ordering of the scan codes associated with the preselected text;

comparing the at least one physical characteristic to at least one stored physical characteristic associated with the at least one authorized user of the computing device; and allowing access to a larger subset of the available functionality based on the comparison and a determination that the scan codes associated with the keypresses match the set of mapping data, the larger subset greater than the limited subset and comprising access to secure data.

2. The computer-implemented method of claim 1, the at least one physical characteristic selected from a group comprising a velocity at which the key is pressed, a pressure exerted to press the key, an amount of time during which the key is held in a fully pressed state, a pressure exerted to hold the key in the fully pressed state, a velocity at which the key is released from the fully pressed state, and an amount of time elapsing from pressing the key to pressing another key.

3. The computer-implemented method of claim 1, the preselected text selected to cause a user to use a defined quantity of digits to operate a defined quantity of keys of the keyboard.

4. The computer-implemented method of claim 1, comprising placing the computing device in an unlocked mode allowing access to the secure data in response to determining that the keypresses are associated with the at least one authorized user and in response to the computing device being in a locked mode denying access to the secure data.

5. The computer-implemented method of claim 4, comprising refining the at least one stored physical characteristic in response to determining that the at least one physical characteristic has changed to an extent consistent with a physical change of the at least one authorized user.

6. The computer-implemented method of claim 4, comprising placing the computing device in the locked mode in response to:
determining that the at least one physical characteristic has changed since a last authentication of an authorized user to an extent consistent with a different user operating the keyboard in place of the authorized user; and
determining that the different user is not an authorized user.

7. The computer-implemented method of claim 4, comprising placing the computing device in the locked mode in response to a predetermined period of time having elapsed since the computing device was last interacted with by an authorized user.

8. The computer-implemented method of claim 7, comprising refraining from placing the computing device in the locked mode in response to detecting the continuing presence of an authorized user in proximity to the computing device.

9. The computer-implemented method of claim 1, comprising presenting the visual prompt on the display of the computing device requesting a user of the computing device to enter the preselected text in response to the user attempting to access the secure data while the computing device is in the locked mode.

10. An apparatus comprising:
a first processor circuit; and
a first storage communicatively coupled to the first processor circuit and storing a first sequence of instructions that when executed by the first processor circuit, causes the first processor circuit to:

allow access to a limited subset of available functionality of a computing device, the limited subset of available functionality comprising access to an application of the computing device that provides an opportunity to enter text;

send a control signal to a display to cause the display to present a visual prompt requesting a user of the computing device to enter a preselected text;

receive signals indicative of keypresses to enter the text at a keyboard communicatively coupled to the computing device, the signals comprising indications of at least one physical characteristic associated with the keypresses and scan codes associated with the keypresses;

determining whether the scan codes associated with the keypresses match a set of mapping data, the set of mapping data comprising indications scan codes associated with the preselected text and an ordering of the scan codes associated with the preselected text;

compare the at least one physical characteristic to at least one stored physical characteristic associated with the at least one authorized user of the computing device; and allow access to a larger subset of the available functionality based on the comparison and a determination that the scan codes associated with the keypresses match the set of mapping data, the larger subset greater than the limited subset and comprising access to secure data.

11. The apparatus of claim 10, the at least one physical characteristic selected from a group comprising a velocity at which the key is pressed, a pressure exerted to press the key, an amount of time during which the key is held in a fully pressed state, a pressure exerted to hold the key in the fully pressed state, a velocity at which the key is released from the fully pressed state, and an amount of time elapsing from pressing the key to pressing another key.

12. The apparatus of claim 10, the keyboard communicatively coupled to the apparatus through an interface through which the apparatus receives the signals from the keyboard as digitally serially transmitted messages from the keyboard.

13. The apparatus of claim 10, comprising the keyboard, a plurality of keys of the keyboard being directly scanned by the apparatus.

14. The apparatus of claim 10, the preselected text selected to cause a user to use a defined quantity of digits to operate a defined quantity of keys of the keyboard.

15. The apparatus of claim 10, the first processor circuit caused to place the apparatus in an unlocked mode allowing access to the secure data in response to determining that the keypresses are associated with the at least one authorized user and in response to the apparatus being in a locked mode denying access to the secure data.

16. The apparatus of claim 15, the first processor circuit caused to refine the at least one stored physical characteristic in response to determining that the at least one physical characteristic has changed to an extent consistent with a physical change of the at least one authorized user.

17. The apparatus of claim 16, the first processor circuit caused to present the visual prompt on the display requesting a user of the apparatus to enter the preselected text in response to the user attempting to access the secure data while the apparatus is in the locked mode.

18. The apparatus of claim 17, comprising:
the display;
a second processor circuit; and a second storage communicatively coupled to the second processor circuit and storing a second sequence of instructions, the first processor circuit causing a visual prompt to be presented comprising the first processor circuit caused by executing the first sequence of instructions to signal the second processor circuit, and the second processor circuit caused by executing the second sequence of instructions to present the visual prompt on the display in response to the signal.

19. The apparatus of claim 15, the first processor circuit caused to place the apparatus in the locked mode in response to:
   the first processor circuit determining that the at least one physical characteristic has changed since a last authentication of an authorized user to an extent consistent with a different user operating the keyboard in place of the authorized user; and
   the first processor circuit determining that the different user is not an authorized user.

20. The apparatus of claim 19, comprising:
   a second processor circuit; and
   a second storage communicatively coupled to the second processor circuit and storing a second sequence of instructions, the first processor circuit causing the apparatus to be placed in one of the locked mode and the unlocked mode comprises the first processor circuit caused by executing the first sequence of instructions to signal the second processor circuit, and the second processor circuit caused by executing the second sequence of instructions to place the apparatus in one of the locked mode and the unlocked mode in response to the signal.

21. The apparatus of claim 15, the first processor circuit caused to place the apparatus in the locked mode in response to a predetermined period of time having elapsed since the apparatus was last interacted with by an authorized user.

22. At least one non-transitory machine-readable storage medium comprising a plurality of instructions that when executed by a computing device, causes the computing device to:
   allow access to a limited subset of available functionality of a computing device, the limited subset of available functionality comprising access to an application of the computing device that provides an opportunity to enter text;
   send a control signal to a display to cause the display to present a visual prompt requesting a user of the computing device to enter a preselected text;
   receive signals indicative of keypresses to enter the text at a keyboard communicatively coupled to the computing device, the signals comprising indications of at least one physical characteristic associated with the keypresses and scan codes associated with the keypresses;
   determining whether the scan codes associated with the keypresses match a set of mapping data, the set of mapping data comprising indications scan codes associated with the preselected text and an ordering of the scan codes associated with the preselected text;
   compare the at least one physical characteristic to at least one stored physical characteristic associated with the at least one authorized user of the computing device; and
   allow access to a larger subset of the available functionality based on the comparison and a determination that the scan codes associated with the keypresses match the set of mapping data, the larger subset greater than the limited subset and comprising access to secure data.

23. The at least one non-transitory machine-readable storage medium of claim 22, the at least one physical characteristic selected from a group comprising a velocity at which the key is pressed, a pressure exerted to press the key, an amount of time during which the key is held in a fully pressed state, a pressure exerted to hold the key in the fully pressed state, a velocity at which the key is released from the fully pressed state, and an amount of time elapsing from pressing the key to pressing another key.

24. The at least one non-transitory machine-readable storage medium of claim 22, the computing device caused to:
   place the computing device in an unlocked mode allowing access to the secure data in response to determining that the keypresses are associated with the at least one authorized user and in response to the computing device being in a locked mode denying access to the secure data.

25. The at least one non-transitory machine-readable storage medium of claim 22, the computing device caused to refine the at least one stored physical characteristic in response to determining that the at least one physical characteristic has changed to an extent consistent with a physical change of the at least one authorized user.

26. An apparatus comprising:
   a first processor circuit;
   a second processor circuit;
   a first storage communicatively coupled to the first processor circuit and storing a first sequence of instructions that when executed by the first processor circuit, causes the first processor circuit to:
      signal the second processor circuit to allow access to a limited subset of available functionality of a computing device, the limited subset of available functionality comprising access to an application of the computing device that provides an opportunity to enter text;
      send a control signal to a display to cause the display to present a visual prompt requesting a user of the computing device to enter a preselected text;
      receive signals indicative of keypresses to enter the text at a keyboard communicatively coupled to the computing device, the signals comprising indications of at least one physical characteristic associated with the keypresses and scan codes associated with the keypresses;
      determining whether the scan codes associated with the keypresses match a set of mapping data, the set of mapping data comprising indications scan codes associated with the preselected text and an ordering of the scan codes associated with the preselected text;
      compare the at least one physical characteristic to at least one stored physical characteristic associated with the at least one authorized user of the computing device based on the determination; and
      signal the second processor circuit to allow access to a larger subset of the available functionality based on the comparison and a determination that the scan codes associated with the keypresses match the set of mapping data, the larger subset greater than the limited subset and comprising access to secure data; and
   a second storage communicatively coupled to the second processor circuit and storing a second sequence of instructions that when executed by the second processor circuit, causes the second processor circuit to allow access to the limited subset and to allow access to the larger subset as signaled by the first processor circuit.

27. The apparatus of claim 26, the first processor circuit caused by executing the first sequence of instructions to signal the second processor circuit to present a visual prompt on a display requesting a user of the apparatus to enter text, and the second processor circuit caused by executing the second sequence of instructions to present the visual prompt on the display in response to receiving the signal from the first processor circuit to present the prompt on the display.

28. The apparatus of claim 26, the first processor circuit caused by executing the first sequence of instructions to refine the at least one stored physical characteristic in response to determining that the at least one physical characteristic has changed to an extent consistent with a physical change of the at least one authorized user.

* * * * *